(12) United States Patent
Nelson

(10) Patent No.: US 10,561,928 B2
(45) Date of Patent: Feb. 18, 2020

(54) USING GAZE DETECTION TO CHANGE TIMING AND BEHAVIOR

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 119 days.

(21) Appl. No.: 15/720,440

(22) Filed: Sep. 29, 2017

(65) Prior Publication Data

US 2019/0099660 A1 Apr. 4, 2019

(51) Int. Cl.
| | | |
|---|---|---|
| G07F 17/00 | (2006.01) | |
| A63F 3/00 | (2006.01) | |
| G07F 17/32 | (2006.01) | |
| A63F 13/25 | (2014.01) | |
| A63F 13/40 | (2014.01) | |
| G06F 3/01 | (2006.01) | |
| A63F 13/213 | (2014.01) | |

(52) U.S. Cl.
CPC ........ *A63F 3/00157* (2013.01); *A63F 13/213* (2014.09); *A63F 13/25* (2014.09); *A63F 13/40* (2014.09); *G06F 3/013* (2013.01); *G06F 3/017* (2013.01); *G07F 17/3206* (2013.01); *G07F 17/3209* (2013.01); *G07F 17/3227* (2013.01); *G07F 17/3246* (2013.01); *G07F 17/3248* (2013.01); *G07F 17/3251* (2013.01); *G07F 17/3258* (2013.01); *G07F 17/3269* (2013.01); *G07F 17/3288* (2013.01)

(58) Field of Classification Search
CPC ........ A63F 13/213; A63F 13/25; A63F 13/40; G06F 3/17; G07F 17/3227; G07F 17/3206; G07F 17/3246; G07F 17/3248; G07F 17/3251; G07F 17/3258; G07F 17/3269; G07F 17/3288
See application file for complete search history.

(56) References Cited

U.S. PATENT DOCUMENTS

| | | |
|---|---|---|
| 6,222,465 B1 | 4/2001 | Kumar et al. |
| 7,815,507 B2 | 10/2010 | Parrott et al. |
| 8,643,680 B2 | 2/2014 | Baldwin et al. |
| 8,721,422 B2 | 5/2014 | Casey et al. |
| 9,244,527 B2 | 1/2016 | Lathrop et al. |
| 9,308,439 B2 | 4/2016 | Aoki et al. |
| 9,715,781 B2 | 7/2017 | Lyons et al. |
| 2011/0304606 A1 | 12/2011 | Walsh |
| 2012/0105486 A1 | 5/2012 | Lankford et al. |
| 2012/0322542 A1 | 12/2012 | Chudd et al. |

(Continued)

*Primary Examiner* — Jay Trent Liddle
*Assistant Examiner* — Alex F. R. P. Rada, III
(74) *Attorney, Agent, or Firm* — Sage Patent Group

(57) ABSTRACT

Methods of operating an electronic gaming machine are provided. Methods may include displaying a game window associated with a wagering game on an electronic display screen of the electronic gaming machine, the game window including first content, receiving, using at least one data capture camera device, gaze direction data that corresponds to a player and that includes information corresponding to a location towards which a gaze of the player is directed, evaluating the gaze direction data to determine a triggering condition corresponding to the first content, and modifying the game window responsive to determining the triggering condition that is based on the gaze direction data.

23 Claims, 12 Drawing Sheets

(56) References Cited

U.S. PATENT DOCUMENTS

| | | | |
|---|---|---|---|
| 2014/0323194 A1* | 10/2014 | Keilwert | G07F 17/3206 463/16 |
| 2015/0169053 A1 | 6/2015 | Bozarth et al. | |
| 2016/0252957 A1 | 9/2016 | Raux | |
| 2017/0169662 A1* | 6/2017 | Froy | G06F 3/005 |
| 2017/0169664 A1* | 6/2017 | Froy | G07F 17/3262 |

* cited by examiner

USING GAZE DETECTION TO CHANGE TIMING AND BEHAVIOR

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to the field of electronic gaming machines, and in particular to electronic gaming machines that track a player's eye gaze.

BACKGROUND

In casinos and other establishments, players may play wagering games using electronic gaming machines (EGMs), such as video gaming terminals. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable users to play games with a touch interface. Example games may be a slot machine game, which may involve a reel of symbols that may move by pulling a lever or pushing a button to activate the reel of symbols. A user may win a prize based on the symbols displayed on the reel. In addition to slot machine-style games, EGMs may be configured to enable users to play a variety of different types of games. For example, some EGMs are configured to provide a tile-matching game, a video poker game, a wheel of fortune game, or other style of game. To interact with a game component of the game, the user may have to press a button that is part of the machine hardware, or the user may have to touch a button displayed on a display screen.

To provide a more immersive and attractive gaming experience, EGM manufacturers have recently been increasing the size of video display screens, and in some cases incorporating three-dimensional display screens, in EGMs. Meanwhile, manufacturers have also been increasing the complexity of content that is displayed on EGMs as players demand more and more complex and visually stimulating content from wagering games. These trends have placed increasing burdens on the hardware of the EGM, causing manufacturers to build EGMs with faster microprocessors, more memory, and/or more powerful graphics processors in each new product cycle, each of which may increase the cost of the EGM. A more immersive and enjoyable gaming experience may also be provided using gaze detection, which is the ability for the hardware and software to determine where a person is looking.

SUMMARY

Some embodiments herein are directed to methods of operating an electronic gaming machine. Methods may include operating a wagering game on the electronic gaming machine, wherein operating the wagering game on the electronic gaming machine includes displaying a game window associated with the wagering game on an electronic display screen of the electronic gaming machine, the game window including a game element. Methods include receiving, using at least one data capture camera device, gaze direction data that corresponds to a player and that includes information corresponding to a location towards which a gaze of the player is directed, evaluating the gaze direction data to determine a triggering condition corresponding to the game element, and modifying the game window responsive to determining the triggering condition that is based on the gaze direction data.

In some embodiments, the game element includes a first timing characteristic, the first timing characteristic includes a game cycle time that is a time duration corresponding to a single play of the wagering game, the triggering condition corresponds to the gaze direction data indicating that the player is not looking at the electronic display screen while the game window is being displayed, and modifying the game window includes reducing the game cycle time by reducing a time corresponding to at least one game feature.

Some embodiments provide that the game element includes a first timing characteristic, that the game element includes a video that includes an animation, a movie and/or an image sequence that is configured to be displayed for a first time duration, that the triggering condition corresponds to the gaze direction data indicating that the gaze of the player is not directed at the game element, and that modifying the first timing characteristic includes causing the game element to be displayed for a second time duration that is less than the first time duration.

In some embodiments, the game element includes a first timing characteristic, the game element includes a video that includes an animation, a movie and/or an image sequence that is configured to be displayed for a first time duration, the triggering condition corresponds to the gaze direction data indicating that the gaze of the player is directed at the game element, and modifying the game window includes causing the game element to be displayed for a second time duration that is greater than the first time duration.

Some embodiments provide that the game element includes a first speed that corresponds to a rate of speed that the game element moves across the electronic display screen, the triggering condition corresponds to the gaze direction data indicating that the gaze of the player is moving across the electronic display screen at a second speed that is different from the first rate of speed, and that modifying the game window includes modifying the rate of speed that the game element moves across the electronic display screen. Some embodiments include determining that player is looking at a mobile device. Modifying the game window includes including a game element to attract attention of the player or sending the player mobile device a message that provides an option to play the wagering game on the mobile device.

In some embodiments, the game element includes a first speed that corresponds to a rate of speed that the game element moves across the electronic display screen, the triggering condition corresponds to the gaze direction data indicating that the gaze of the player is not directed to the game element, and modifying the game window includes modifying the rate of speed that the game element moves across the screen to a second speed that is greater than the first speed.

Some embodiments provide that the game window includes a first game window and the electronic display screen includes a first electronic display screen, operating the wagering game further includes displaying the first game window on the first electronic display screen and a second game window on a second electronic display screen, responsive to the gaze direction data indicating that the gaze of the player is directed to the second game window, displaying content on both the first game window and the second game window that corresponds to the wagering game, and, responsive to the gaze direction data indicating that the gaze of the player is not directed to the second game window, displaying content on the first game window that corresponds to the wagering game and displaying content on the second game window that does not correspond to the wagering game.

In some embodiments, the game window includes a first game window and the electronic display screen includes a first electronic display screen, operating the wagering game further includes displaying the first game window on the first electronic display screen and a second game window on a second electronic display screen, and, responsive to the gaze direction data indicating that the gaze of the player is directed to the first game window, content is displayed on the first game window that communicates a message to the player to look at the second game window.

Some embodiments provide that the game window includes a plurality of game elements, ones of the plurality of game elements are spin animations of game reels that each include a plurality of symbols thereon, and, responsive to the gaze direction data indicating that that player has an interest in a given symbol of the plurality of symbols, a frequency that the given symbol is displayed during the spin animations is increased.

In some embodiments, the game window includes a plurality of game elements,
  wherein ones of the plurality of game elements are spin animations of game reels that each include a plurality of symbols thereon, responsive to the gaze direction data indicating that that player has an interest in a given symbol of the plurality of symbols, outcomes that are near misses relative to a jackpot that include the given symbol are generated.

Some embodiments provide that the game element includes a key element that includes information to the player that has a higher value than information corresponding to other game elements, the gaze direction data is evaluated to determine if the player has looked at the key element, and, responsive to determining that the player has not looked at the key element, modifying the game window includes visually highlighting the key element to attract attention of the player.

In some embodiments, the game element includes a key element that includes information to the player that has a higher value than information corresponding to other game elements, the gaze direction data is evaluated to determine that the player has not looked at the key element, and, responsive to determining that the player has not looked at the key element, the key element is moved to the location towards which the gaze of the player is directed.

Some embodiments provide that the game window includes a plurality of game elements, ones of the plurality of game elements are spin animations of game reels, responsive to the gaze direction data indicating that that player has an interest in a given reel of the plurality of reels while the given reel is still spinning, an anticipation event that increases the player excitement is generated, and the anticipation event includes an anticipation sound and/or a delay in stopping the given reel.

In some embodiments, determining the triggering condition includes determining that the player is confused about playing the wagering game, and modifying the game window includes displaying information corresponding to playing the wagering game.

Some embodiments include determining an emotional state of the player that corresponds to the player looking at the game element. Responsive to determining that the player has a positive emotional state corresponding to the game element, the game window is modified to increase a presence of the game element, and, responsive to determining that the player has a negative emotional state corresponding to the game element, the game window is modified to reduce the presence of the game element.

In some embodiments, the game window includes a first game window and the electronic display screen includes a first electronic display screen, operating the wagering game further includes displaying the first game window on the first electronic display screen and a second game window on a second electronic display screen, receiving the gaze direction data includes receiving, using a first data capture camera device, first gaze direction data corresponding to the first electronic display screen and receiving, using a second data capture camera device, second gaze direction data corresponding to the second electronic display screen. Responsive to moving the game element in a path that goes from the first electronic display screen to the second electronic display screen, the first or second gaze direction data is calibrated.

Some embodiments are directed to methods of operating an electronic gaming machine. Such methods include displaying a game window associated with a wagering game on an electronic display screen of the electronic gaming machine, the game window including first content, receiving, using at least one data capture camera device, gaze direction data that corresponds to a player and that includes information corresponding to a location towards which a gaze of the player is directed, evaluating the gaze direction data to determine a triggering condition corresponding to the first content, and modifying the game window responsive to determining the triggering condition that is based on the gaze direction data.

In some embodiments, the game window further includes second content that is different from the first content, the first content is associated with a first game and the second content is associated with a second game, evaluating the gaze direction data includes determining a first amount of time during a time interval that the player is looking at the first content and a second amount of time during the time interval that the player is looking at the second content, the triggering condition corresponds to the gaze direction data indicating that the player is looking at the first content more than the second content, and modifying the game window includes modifying a display order to display the first content at a higher position than the second content.

Some embodiments include receiving interest data that corresponds to associations between game elements and player interest data that corresponds to ones of the game elements and that is determined based on the gaze direction data. In some embodiments, modifying the game window includes providing second content that is different from the first content and that includes ones of the game elements that the player interest data indicates are interesting to the player.

Some embodiments provide that the game elements include at least one of a game feature type, a game element category, a game theme, a color, and a graphics property.

In some embodiments, modifying the game window includes removing the first content that includes ones of the game elements that the player interest data indicates are not interesting to the player.

Some embodiments provide that the game window includes a game selection window that includes selection content corresponding to a plurality of games, and an arrangement of the plurality of games is based on the gaze direction data.

Some embodiments are directed to an electronic gaming machine that includes a processor, a display device, a display controller coupled to the processor and the display device, and a gaze detection unit coupled to the processor and configured to detect a gaze direction of the viewer. The processor is configured to operate a wagering game on the electronic gaming machine, wherein to operate the wagering game on the electronic gaming machine. The processor is further configured to display a game window associated with the wagering game on an electronic display screen of the electronic gaming machine, the game window including a game element, receive, using at least one data capture camera device, gaze direction data that corresponds to a player and that includes information corresponding to a location towards which a gaze of the player is directed, evaluate the gaze direction data to determine a triggering condition corresponding to the game element and modify the game window responsive to determining the triggering condition that is based on the gaze direction data.

In some embodiments, the processor is further configured to determine that player is looking at a mobile device and include a game element to attract attention of the player or send the player mobile device a message that provides an option to play the wagering game on the mobile device.

Some embodiments provide that the processor is further configured to determine an emotional state of the player that corresponds to the player looking at the game element, wherein, responsive to determining that the player has a positive emotional state corresponding to the game element, to modify the game window to increase a presence of the game element, and wherein, responsive to determining that the player has a negative emotional state corresponding to the game element, to modify the game window to reduce the presence of the game element.

Some further embodiments provide computer program products including a non-transitory computer readable storage medium on which computer program instructions are stored, the computer program instructions configuring an electronic gaming machine to perform operations disclosed herein.

DETAILED DESCRIPTION OF EMBODIMENTS

Figure 1A:
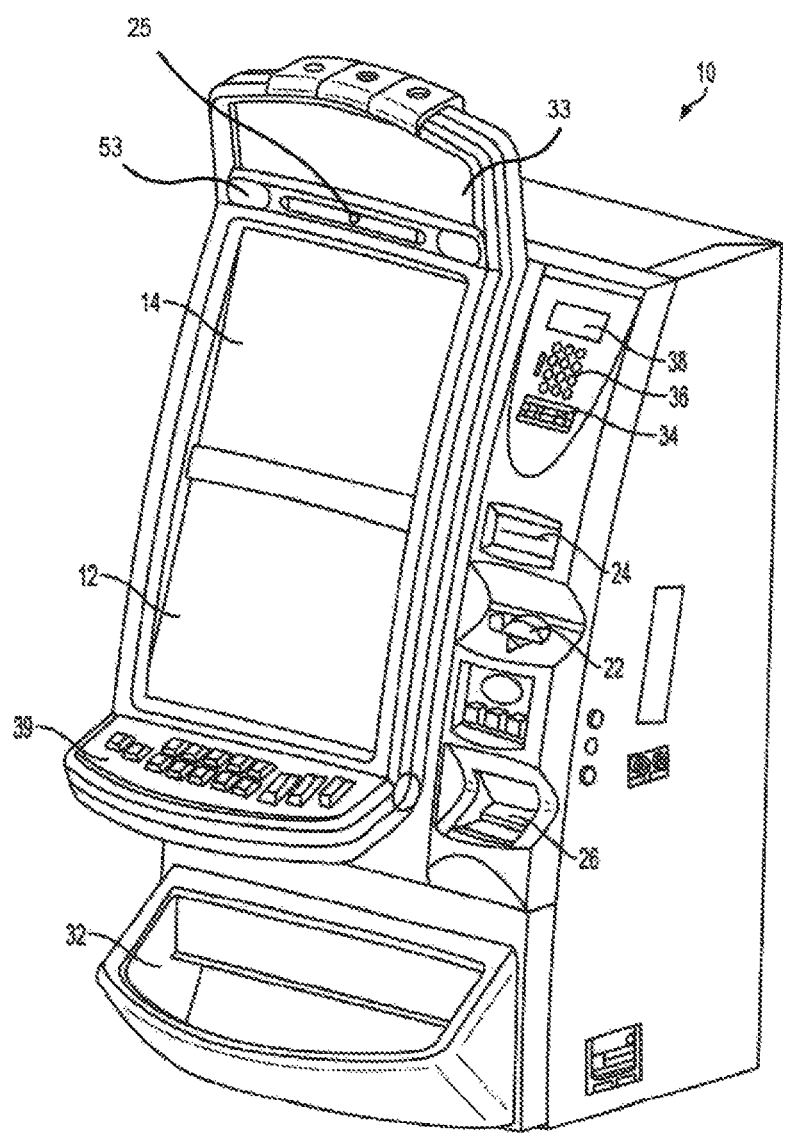
FIG. 1A is a perspective view of an electronic gaming machine according to some embodiments.

Embodiments described herein relate to enhanced electronic gaming machines (EGMs) that are capable of displaying multiple concurrent games simultaneously and that are capable of tracking the eye gaze of the player. In an EGM according to some embodiments, the operation of the EGM, and in particular the operation of the EGM to operate and/or display at least one of the concurrently displayed games, may be controlled in response to the player's eye gaze. In particular, in some embodiments, an aspect of one of the concurrently displayed games may be controlled based on whether the EGM determines that the player is looking, or is not looking, at the one of the concurrently displayed games. The use of gaze detection data may be improved and/or augmented by using other secondary inputs in conjunction with the gaze detection data.

The EGM may include at least one data capture camera device that is configured to monitor the eye gaze of the player to collect player eye gaze data. Such monitoring may be performed continuously or selectively when eye gaze data is needed. The graphics processor of the EGM may be configured to generate a plurality of interactive game environments using the game data of a plurality of interactive games. The display device of the EGM may display a viewing area for each of the plurality of interactive games, which may form a portion of the interactive game environment for each game.

The EGM may be configured with algorithms to process recorded image data to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM.

The EGM may have a game controller that can determine the location of the eye gaze of the player relative to the viewing area by mapping the location of the player eye gaze on the display device to the viewing area. The player eye gaze data can be analyzed to determine what the player is looking at. The game controller may trigger a control command to the display controller of the EGM to dynamically update the rendering of the viewing area of one or more of the concurrently displayed games based on the player eye gaze data. For example, in response to the control command, the display controller may control the display device in real-time or near real-time using the graphics processor to dynamically update the rendering of the viewing area to provide a real-time or near real-time graphical animation effect displayed on the display device to update the visible game components in the viewing area based on the player eye gaze data.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade.

Figure 1B:
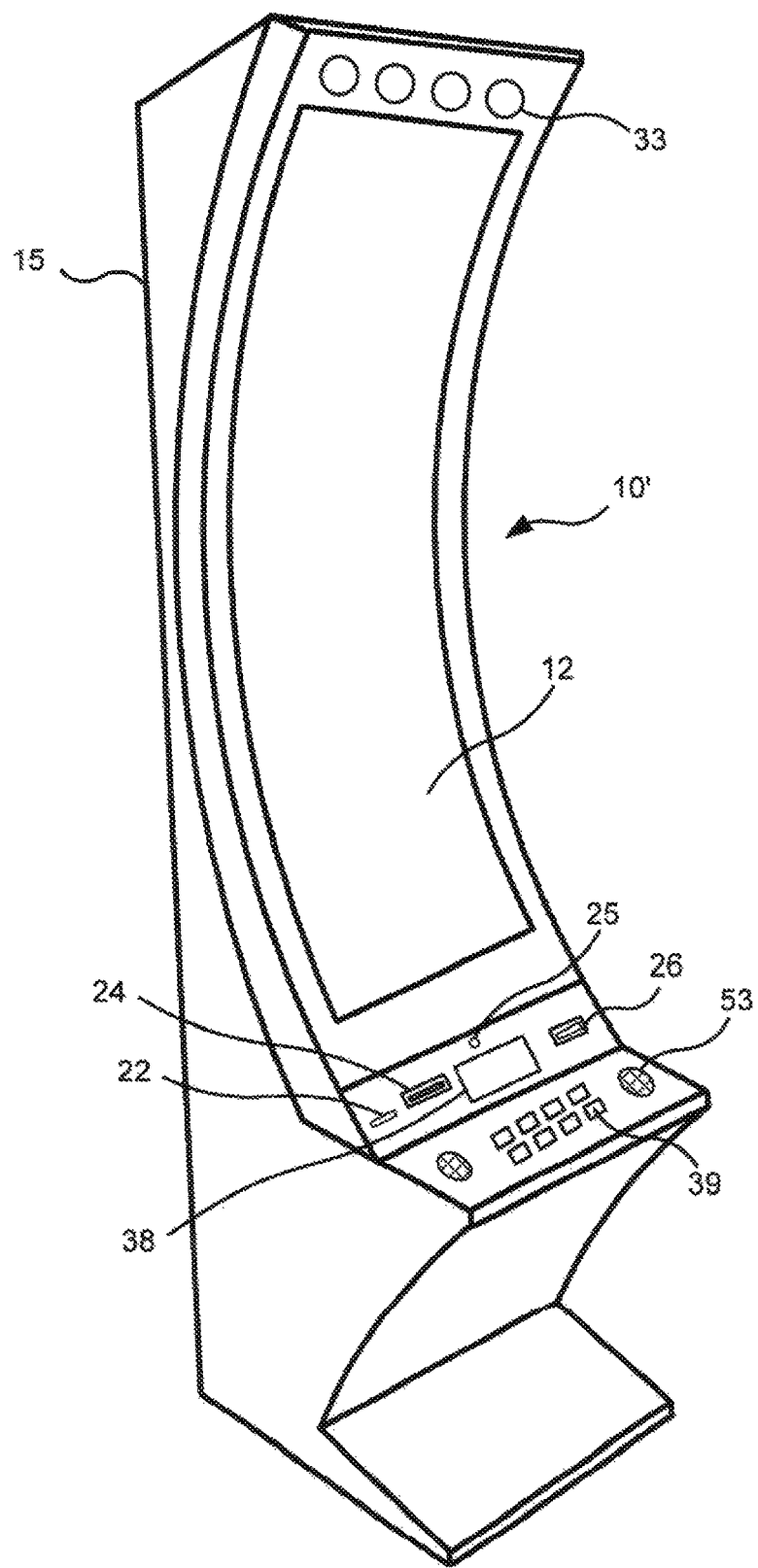
FIG. 1B is a perspective view of an electronic gaming machine according to further embodiments.

FIG. 1A is a perspective view of an EGM 10, and FIG. 1B is a perspective view of an EGM 10', that are configured to monitor eye gaze of a player to collect player eye gaze data, and to control operation of one of a displayed game in response to the player eye gaze data in accordance with some embodiments. A game controller may determine a location of the eye gaze of the player relative to a viewing area of the interactive game environment using the player eye gaze data and triggering a control command to control operation of the displayed game. In particular, a display controller in the EGM may dynamically update the rendering of the viewing area or a portion of the viewing area based on the player eye gaze data.

The EGM 10 has at least one data storage device to store game data for a plurality of interactive games. The data storage device may store game data for one or more primary interactive games and one or more bonus interactive games. The display controller may detect a control command from a game controller of the EGM and responsive to such command may dynamically update the rendering of the viewing area.

The example EGM 10 illustrated in FIG. 1A includes a display device 12 that may include a thin film transistor (TFT) display, a liquid crystal display (LCD), a cathode ray tube (CRT), auto stereoscopic 3D display and LED display, an OLED display, or any other type of display. An optional second display device 14 provides game data or other information in addition to display device 12. The display devices 12, 14, may have 2D display capabilities or 3D display capabilities, or both. The second display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. The display devices 12, 14 may display at least a portion of the visible game components of a plurality of interactive games. In particular, the display devices may simultaneously display a plurality of concurrently active interactive games.

The EGM 10 includes speakers 53 for playing audio associated with the games, which may include background music, sound effects, voiceovers, and other types of sounds. The sounds generated by the EGM 10 may be associated with one or more games playable on the EGM 10.

The EGM 10 further includes accent lights 33 that are separate from the display devices. Activation of the accent lights 33 may be coordinated with the game play of a game on the EGM 10. For example, when the player wins a prize, the accent lights may be activated and caused to flash different colors. The accent lights 33 may, for example, include RGB LEDs that can be programmed to flash or light up in different colors, patterns, brightnesses, etc. The accent lights 33 may be further synchronized with animations displayed on the display device 12, 14 and sounds played on the speakers 53.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

The EGM 10 may include a data capture camera device 25 that is configured to continuously detect and monitor player interaction commands (e.g. eye gaze, eye gestures, player movement, touch, gestures) to interact with the viewing area and game components displayed on the display device 12, 14. Images from the data capture camera device 25 are transmitted to a game controller which determines a location of the eye gaze of the player(s) relative to the viewing area using the data provided by the data capture device 25. In some embodiments, a separate eye gaze tracking module including a data capture device and a processor may be provided. The processor of the eye gaze module may determine a location of the eye gaze of the player relative to the viewing area using the data provided by the data capture device, and the eye gaze tracking module may provide player eye gaze data to the game controller.

Eye gaze data may be captured for multiple players of an EGM 10. Accordingly, the player eye gaze data may include eye gaze data of multiple players. It will be appreciated that any reference herein to a player in the singular may include multiple players.

The data capture camera device 25 may include a single detector configured to capture images of the player or players of the EGM 10 from a single direction or multiple detectors configured to capture images of the player or players from multiple directions. The EGM 10 may be configured to detect the presence and location of multiple players.

In some embodiments, the game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

The display device 12, 14 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

The EGM 10 may include a physical device for receiving and accepting value from a player, such as a coin, bill, token, printed ticket, magnetic card, or other token of value in return for which the player is granted credits on the EGM 10. For example, a coin acceptor 22 may have a coin slot that accepts coins or tokens in one or more denominations to generate credits within EGM 10 for playing games. A ticket acceptor 24 includes an input slot that receives machine readable printed tickets and outputs printed tickets for use in cashless gaming. A bill acceptor 26 receives and validates paper money deposited by the player.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 10 may include a scanner for scanning a barcode indicative of a cryptocurrency address, such as a bitcoin, litecoin or ethereum address, to permit the EGM 10 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. Card reader slot 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touch-screen, or dynamic digital button panel, in accordance with some embodiments.

The EGM 10 may include a plurality of player control buttons 39 that include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The EGM 10 may also include a digital button panel 39. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 10 may also include hardware configured to provide eye, motion or gesture tracking. For example, the EGM 10 may include at least one data capture camera device 25, which may be one or more cameras that detect one or more spectra of light, one or more sensors (e.g. optical sensor), or a combination thereof. The data capture camera device 25 may be used for eye, gesture or motion tracking of player, such as detecting eye movement, eye gestures, player positions and movements, and generating signals defining x, y and z coordinates. For example, the data capture camera device 25 may be used to implement tracking recognition techniques to collect player eye gaze data, player eye gesture data, and player movement data. An example type of motion tracking is optical motion tracking. The motion tracking may include a body and head controller. The motion tracking may also include an eye controller. The EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, the EGM 10 may be configured to capture player eye gaze input, eye gesture input, and movement input as player interaction commands.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The data capture camera device 25 may capture player data, such as button input, gesture input and so on. The data capture camera device 25 may include a camera, a sensor or other data capture electronic hardware. In some embodiments, EGM 10 may include at least one data capture camera device that continuously monitors the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, the EGM 10 may be configured to provide an interactive game environment that concurrently displays a game to a player. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

In some embodiments, an EGM 10 may be implemented by a desktop computer, a laptop personal computer, a personal digital assistant (PDA), portable computing device, or other computerized platform. In some embodiments, the EGM 10 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1C:
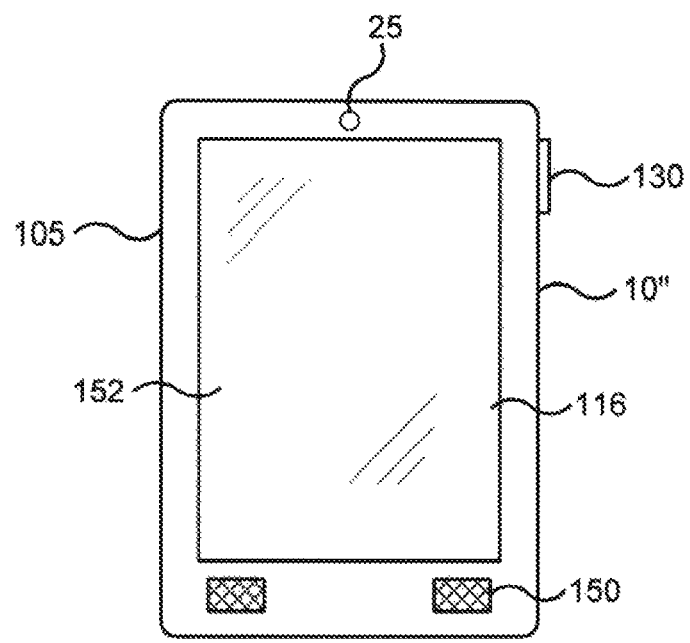
FIG. 1C is a perspective view of a handheld electronic gaming machine according to further embodiments.

For example, referring to FIG. 1C, an EGM 10″ may be implemented as a handheld device including a compact housing 105 on which is mounted a touchscreen display device 116 including a digitizer 152. An input button 131 may be provided on the housing and may act as a power or control button. A camera 25 may be provided in a front face of the housing 105. The housing 105 may include one or more speakers 151. In the EGM 10″, various input buttons described above, such as the cashout button, gameplay activation button, etc., may be implemented as soft buttons on the touchscreen display device 116. Moreover, the EGM 10″ may omit certain features, such as a bill acceptor, a ticket generator, a coin acceptor or dispenser, a card reader, secondary displays, a bet display, a credit display, etc. Credits can be deposited in or transferred from the EGM 10″ electronically.

Figure 2:
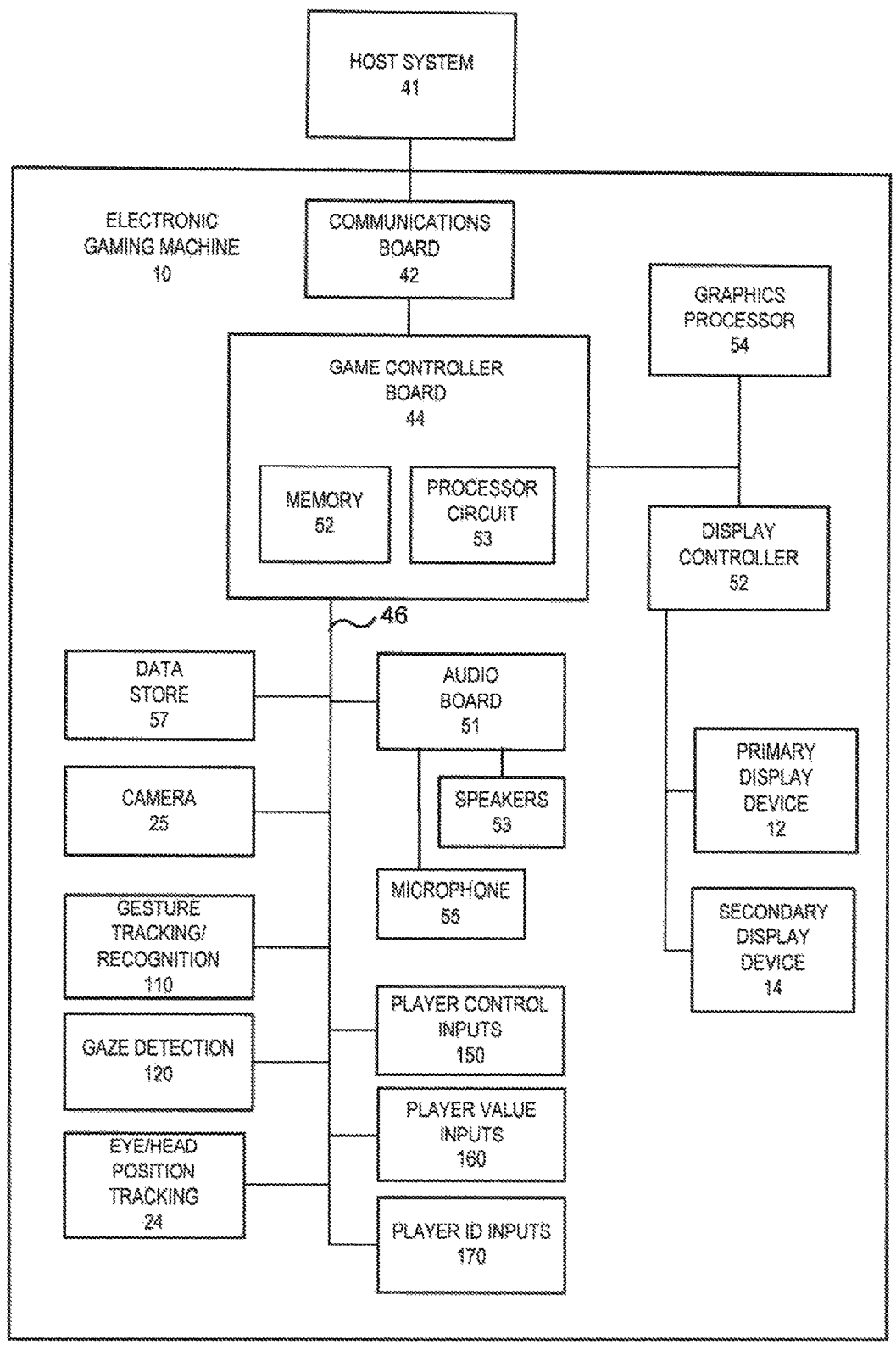
FIG. 2 is a schematic diagram of an electronic gaming machine linked to a casino host system according to some embodiments.

FIG. 2 is a block diagram of some components of EGM 10 according to some embodiments. The EGM 10 is shown linked to the casino's host system 41 via network infrastructure. These hardware components are particularly configured to provide at least one interactive game. These hardware components may be configured to provide at least one interactive game and at least one bonus game, and in some cases to provide a plurality of concurrently displayed interactive games.

A communications board 42 may contain circuitry for coupling the EGM 10 to network. The communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 10 may communicate over a network using a suitable protocol, such as the G2S protocols.

The communications board 42 may communicate, transmit and receive data using a wireless transmitter, or it may be wired to a network, such as a local area network running throughout the casino floor, for example. The communications board 42 may set up a communication link with a master controller and may buffer data between the network and a game controller board 44. The communications board 42 may also communicate with a network server, such as in accordance with the G2S standard, for exchanging information to carry out embodiments described herein.

The game controller board 44 includes a memory 52 and a processor circuit 53 for carrying out program instructions stored in the memory and for providing the information requested by the network. Game data for one or more game programs may be stored in the memory 52. The processor circuit 53 may be a multi-core processor including two or more independent processing units. Each of the cores in the processor circuit 53 may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. The game controller board 44 executes game routines using game data stores in a data store 57 accessible to the game controller board 44, and cooperates with a graphics processor 54 and a display controller 52 to provide games with enhanced interactive game components. The graphics processor 54 may have an integrated high-speed dedicated graphics memory.

The EGM 10 may include at least one data capture camera device 25 for implementing the gaming enhancements, in accordance with some embodiments. The EGM 10 may include the data capture camera device 25, one or more sensors (e.g. optical sensor), or other hardware device configured to capture and collect in real-time or near real-time data relating to the eye gaze, eye gesture, or movement of the player(s), or any combination thereof.

In some embodiments, the data capture camera device 25 may be used for eye gaze tracking, eye gesture tracking, motion tracking, and movement recognition. The data capture camera device 25 may collect data defining x, y and z coordinates representing eye gaze, eye gestures, and movement of the player(s).

In some embodiments, the data capture camera device 25 may track a position of each eye of a player relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the data capture camera device 25 may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play.

As previously described, the data capture camera device 25 may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The display controller 52 may control one or more of display device 12, 14 the using graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 12, 14 using graphics processor 54. Display controller 52 may update the viewing area to trigger a graphical animation effect displayed on one or both of display device 12, 14 representative of a visual update to the visible game components in the viewing area, the visual update based on the player eye gaze data, player eye gesture data, or player movement data.

Peripheral devices/boards in the EGM 10 may communicate with the game controller board 44 via a bus 46 using, for example, an RS-232 interface. Such peripherals may include a bill acceptor, a coin acceptor, a ticket acceptor, a smart card reader or other type of credit card reader, and player control inputs 150 (such as buttons or a touch screen).

The player control inputs 150 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 12, 14 may be a touch sensitive display device. A player control input device 150 may be integrated with the display device 12, 14 to detect player interaction input at the display device 12, 14.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 10 may include a scanner for scanning a barcode indicative of a cryptocurrency address, such as a bitcoin, litecoin or ethereum address, to permit the EGM 100 to transfer credits to a player in the form of a cryptocurrency.

Peripheral devices/boards in the EGM 10 may communicate with the game controller board 44 via a bus 46 using, for example, an RS-232 interface. Such peripherals may include player value input devices 160, which may include a bill acceptor 26, a coin acceptor 22, and a smart card reader or other type of credit card reader 34, and player control inputs 150 (such as buttons or a touch screen). The EGM may further include one or more player identification input devices 170, such as a card reader for reading a player loyalty card, a biometric input, keypad, or other input device that allows the player to identify him or herself.

The game controller board 44 may also control one or more devices that produce the game output including audio and video output associated with a particular game that is presented to the user. For example, an audio board 51 may convert coded signals into analog signals for driving speakers 53. Some embodiments provide that an audio board may convert audio signals, either analog or digital, that are received via a microphone 55, into coded signals.

The game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 10, or may reside at the host system 41. In some embodiments, the electronic data store storing game data may reside in the cloud.

The card reader 34 reads cards for player and credit information for cashless gaming. The card reader 34 may read a magnetic code on a conventional player tracking card, where the code uniquely identifies the player to a host system at the venue. The code is cross-referenced by the host system 41 to any data related to the player, and such data may affect the games offered to the player by the gaming terminal. The card reader 34 may also include an optical reader and printer for reading and printing coded barcodes and other information on a paper ticket. A card may also include credentials that enable the host system 41 to access one or more accounts associated with a user. The account may be debited based on wagers by a user and credited based on a win.

The graphics processor 54 may be configured to generate and render animation game enhancements based on game data as directed by the game controller board 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller board 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may require a high data transfer rate and may convert coded signals to pixel signals for the display. The display controller 52 and the audio board 51 may be directly connected to parallel ports on the game controller board 44. The electronics on the various boards may be combined onto a single board. The display controller 52 may control output to one or more display device 12, 14 (e.g. an electronic touch sensitive display device). The display controller 52 may cooperate with graphics processor 54 to render animation enhancements on the display device 12, 14.

The display controller 52 may be configured to interact with graphics processor 54 to control the display device 12,

14 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

In some embodiments, the display controller 52 may control the display device 12, 14 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

The EGM 10 further includes functional units for performing various features described herein, including a gesture recognition unit 110, a gaze detection unit 120, and an eye/head position tracking unit 130, which are described in more detail below. Each of the functional units 110, 120, 130 and 140 may include a processing circuits, including signal processing units, and memory and/or storage that is separate from the processor circuit 53, memory 52 and/or data store 57 of the EGM 100, or may utilize resources of the game controller board including the processor circuit 53, memory 52 and/or data store 57 of the EGM 100.

Three-Dimensional Display and Head Position Tracking

As described herein, the EGM 10 may be configured to provide an interactive game environment that displays three-dimensional interactive game content to a player. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player as described in more detail below.

The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

In some embodiments, the EGM 10 may include a display device 12, 14 with autostereoscopic 3D functionality. An autostereoscopic 3D display projects a three-dimensional image to a viewer. The three-dimensional image can be perceived by the viewer without the need for the viewer to use special glasses, such as three-dimensional viewing glasses or a three-dimensional viewing headset. Autostereoscopic displays operate by projecting different images to the viewer's left and right eyes. The two images are synthesized by the viewer into a single three-dimensional image. Separate images may be projected to the viewer's left and right eyes, for example, by locating the viewer's head in three-dimensional space and projecting the left and right images to the player using one or more lenticular lenses.

The lenticular lense(s) cause certain pixels of the screen to be visible only to the player's right eye and certain other pixels of the screen to be visible only to the left eye of the player. When the player's head position is changed, the display device also changes the pixel positions for the left eye and the right eye of the player. The head position or changes thereto determined by an eye/head position tracker are used by the EGM 10 to choose or select the correct pixels for the left eye and the right eye of the player.

It should also be appreciated that other suitable eye tracking or head tracking systems or devices can be employed in accordance with the present disclosure.

In this illustrated example embodiment, the EGM 10 includes a player eye/head position tracking unit 130 that is configured to track the location of the head of the player. The player eye/head position tracking unit 130 includes one or more eye/head position tracking cameras such as camera 25. The eye/head position tracking camera 25 is configured to track the position of the player's head as they move in front of the display device 12, 14. More specifically, the eye/head position tracking camera 25 is configured to track the position of the player's head as they move in a head tracking zone in front of the EGM 10. The eye/head position tracking unit 130 may also detect an angle and orientation of the player's head. In the embodiments where two or more head tracking cameras are employed, such multiple cameras work together to track the position of the player's head as they move in front of the display device 12, 14. In various embodiments, the cameras 25 are spaced apart by a distance that allows the cameras 25 to view the player's head from positions that differ by a sufficient angle (e.g., 10 degrees) to allow the cameras 25 to capture different views of the player's head from which the position of the player's head can be more accurately estimated. For example, when the player's head is expected to be about 24 inches from the surface of the display 12, 14, the cameras 25 may be spaced apart by at least about 6 inches.

In various embodiments, the processor(s), memory device(s), the player head tracking unit 130, and the display device of the EGM 10 align the coordinate system of a virtual display area (or world) with the real world by using the eye/head position information obtained from the player head tracking unit 130. When the player moves his head around, the display device of the EGM 10 causes the virtual object(s) to appear to the player to stay in place where it is. Therefore, the EGM 10 uses the eye/head position to fix the object(s) in space. The actual 3D stereo projection by the display device changes according to the eye/head position, but to the player, the virtual object(s) may appear or seems to stay where it is.

It should be appreciated that the location of a head tracking zone may vary in accordance with the present disclosure based on the configuration and position of the head tracking camera 25. It should also be appreciated that more than one head tracking camera 25 may be employed in the EGM 10 in accordance with the present disclosure. It should further be appreciated that the one or more head tracking cameras 25 may be employed in the EGM 10 in different positions adjacent the display device or elsewhere on the EGM 10 in accordance with the present disclosure.

The display controller 52 may control the display device 12, 14 using the graphics processor 54 to display a viewing area that may include one or more visible game components based on the game data of currently displayed interactive games.

The display controller 52 may, in response to detection of the control command from the game controller 44 based on the player eye gaze data, player eye gesture data, or player movement data, control display device 12, 14 using the graphics processor 54. The display controller 52 may update the viewing area to trigger a graphical animation effect displayed on one or both of display device 120 representative of a visual update to the visible game components in the viewing area, the visual update based on the player eye gaze data, player eye gesture data, or player movement data.

In some embodiments, the display controller 52 may control the display device 12, 14 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Player Gaze Detection

Referring again to FIGS. 1A and 2, the EGM 10 may include a gaze detection unit 120 including at least one gaze direction tracking camera 25 that is configured to continuously detect and monitor player the gaze direction of a player playing the EGM 10. The gaze direction tracking camera 25 may be a separate device or may be the same device as the camera device 25 used for eye/head position tracking as described above.

Images from the gaze direction tracking camera 25 are transmitted to the gaze detection unit 120 which determines a location of the eye gaze of the player(s) relative to the viewing area using the data provided by the gaze direction tracking camera 25. The gaze detection unit 120 may determine a location of the eye gaze of the player relative to the viewing area using the data provided by the data capture device, and the gaze detection unit 120 may provide player eye gaze data to the game controller 44.

The gaze direction tracking camera 25 may include a single detector configured to capture images of the player or players of the EGM 10 from a single direction or multiple detectors configured to capture images of the player or players from multiple directions. The EGM 10 may be configured to detect the presence and location of multiple players. Accordingly, eye gaze data may be captured for multiple players of an EGM 10. Accordingly, the player eye gaze data may include eye gaze data of multiple players. It will be appreciated that any reference herein to a player in the singular may include multiple players.

In some embodiments, the game controller 44 may cause the display controller 52 to dynamically update the rendering of the viewing area based on the player eye gaze data. The display controller 52 may control the display device 12, 14 using the graphics processor 54 to dynamically update the rendering of the viewing area to provide a graphical animation effect that alters the visible game components in the viewing area based on the player eye gaze data. In some embodiments, the game controller 44 may provide a control command to the display controller 52 based on the eye gaze or eye gesture of the player, or any combination thereof. The eye gaze of the player may be the location on the display device 12, 14 or in the three-dimensional viewing area in front of the display device 12, 14 where the player is looking.

An eye gesture of the player may be made by the player using one or more eyes, such as widening the eyes, narrowing the eyes, blinking, and opening one eye and closing the other.

A winning outcome of the game for provision of an award may be triggered based on the eye gaze or eye gesture of the player. For example, by looking at a game component displayed by the display controller on the display device 12, 14 for a pre-determined period of time, the player may trigger a winning outcome. The award may include credits, free games, mega pot, small pot, progressive pot, and so on.

The gaze detection unit 120 may be used for eye, gesture or motion tracking of player, such as detecting eye movement, eye gestures, player positions and movements, and generating signals defining x, y and z coordinates associated with the player's eye gaze. The EGM 10 may implement eye-tracking recognition technology using cameras, sensors (e.g. optical sensor), data receivers and other electronic hardware to capture various forms of player input. The eye gaze or eye gesture by a player may interact with the interactive game environment or may impact the type of graphical animation effect. Accordingly, the EGM 10 may be configured to capture player eye gaze input, eye gesture input, and movement input as player interaction commands.

In some embodiments, the gaze detection unit 120 may track a position of each eye of a player relative to the display device 12, 14 as well as a direction of focus of the eyes and a point of focus on the display device 12, 14, in real-time or near real-time. The focus direction may be the direction at which the player's line of sight travels or extends from his or her eyes to the display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the gaze detection unit 120 may monitor the eye gaze and/or eye gesture of two or more people, who may be two or more players of the interactive game, to collect the player eye gaze data and/or player eye gesture data. The player eye gaze data and/or player eye gesture data may be used such that both players may be able to play the interactive game simultaneously. The interactive game may include aspects of both cooperative and competitive play.

As previously described, the gaze detection unit 120 may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

Figure 3:
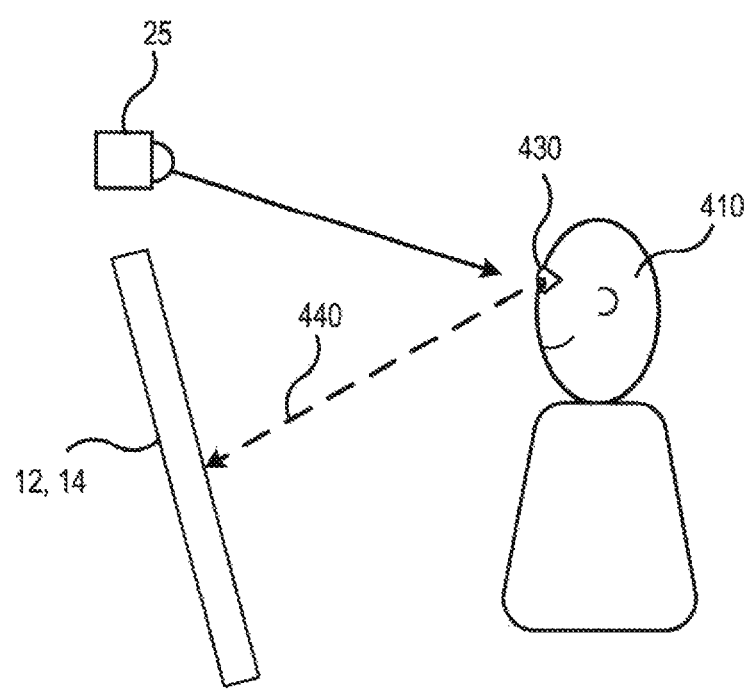
FIG. 3 is a flowchart diagram of a method implemented by an electronic gaming machine according to some embodiments.

Referring to FIG. 3, in some embodiments, the gaze detection unit 120 may determine the location of the eye gaze relative to the viewing area based on the position of the player's eyes relative to the EGM 10 and an angle of the player's eyes. As shown in FIG. 3, the gaze detection unit 120 may use the gaze detection tracking camera 25 to monitor the position of the player's eyes 430 relative to EGM 10, and may also monitor the angle of the player's eyes 430 to collect display mapping data. The angle of the player's eyes 430 may define the focus of the eye gaze, which may be a line of sight relative to the display device 12, 14. Based on the display mapping data, which may include the position of the player's eyes relative to the EGM 10 and an angle of the player's eyes or the line of sight relative, the gaze detection unit 120 may be configured to determine the direction and length of a virtual arrow 440 projecting from the player's eyes 430. The virtual arrow 440 may represent the eye gaze of the player 410. The gaze detection unit 120 and/or the game controller 44 may determine where the virtual arrow 440 intersects with the display device 12, 14. The intersection of the virtual arrow 440 and display device 12, 14 may represent where the eye gaze of the player 410 is focused on the display device 12, 14. The display device 12, 14 may be controlled by display controller 52 to display the viewing area. The gaze detection unit 120 may identify coordinates on the display device 12, 14 corresponding to the player eye gaze data and may map the coordinates to the viewing area to determine the eye gaze of the player relative to the viewing area. The EGM 10 may determine the location of the viewing area that the player 410 is looking at, which may be useful for the EGM 10 to determine how the player 410 is interacting with the interactive game. In some embodiments, the eye gaze of the player may be expressed in 2D or 3D and may be mapped to a 2D surface, such as the surface of the display device 12, 14, or a 3D viewing area, such as the viewing area in front of the primary display device 12, 14.

Figure 4:
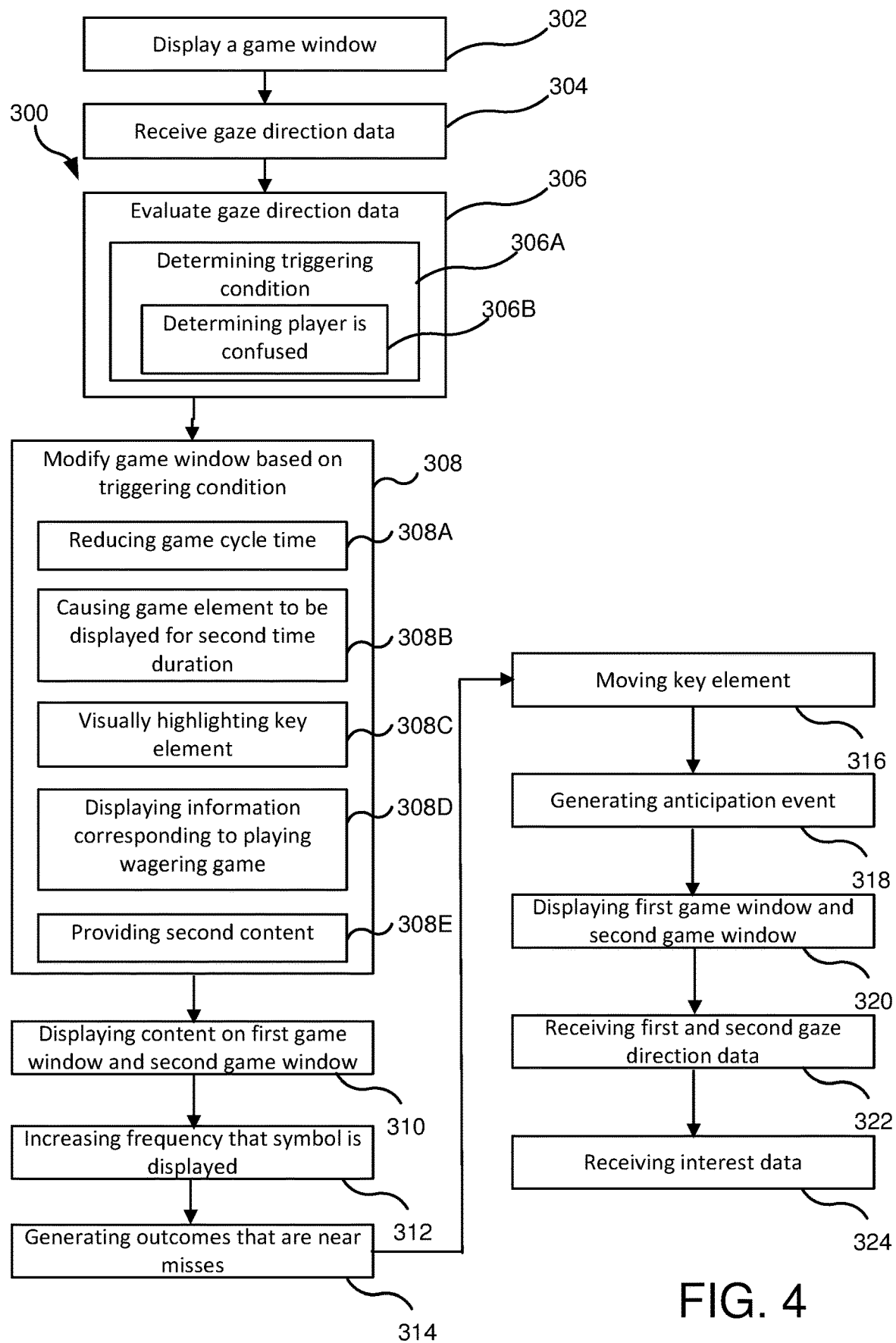
FIG. 4 is a flowchart diagram of operations for performing a method implemented by an electronic gaming machine (EGM) according to some embodiments.

Reference is now made to FIG. 4, which is a flowchart diagram of operations for performing a method 300 implemented by an electronic gaming machine (EGM) according to some embodiments. Some embodiments provide that the method 300 may include operating a wagering game on the electronic gaming machine. In some embodiments, operating the wagering game on the EGM may include displaying a game window that is associated with the wagering game on an electronic display screen of the EGM (block 302). The game window may include one or more game elements. Displaying the game window may include displaying game windows corresponding to one or more different wagering games that may be played concurrently.

Operating the wagering game may include receiving gaze direction data corresponding to a player (block 304). Some embodiments provide that the gaze direction data may be provided by one or more data capture camera devices 25 as described above. The data capture camera devices 25 may be devices that are included in the EGM and/or may be devices that are external to the EGM and that are communicatively coupled thereto.

The gaze direction data of the player is evaluated to determine a triggering condition corresponding to one or more of the game elements (block 306). The evaluation may be performed on the combination of the gaze direction data and a location of one or more of the game elements. The triggering condition may be determined as a result of the evaluation.

Responsive to the evaluation of the gaze direction data and whether or not a triggering condition is determined, the game window may be modified (block 308.) In some embodiments, timing related modifications to the game window and/or game elements therein may be made based on the evaluation of the gaze direction data. In other embodiments, game elements may be selected, moved and/or added based on the evaluation of the gaze direction data to affect a behavioral change in the player and/or spectator. Some embodiments provide that evaluating gaze direction data(block 306)includes determining a triggering condition (block 306A) that may include determining that a player is confused (block 306B). Some embodiments provide that modifying a game window based on a triggering condition (block 308) may include reducing a game cycle time (block 308A), causing a game element to be displayed for a second time duration (block 308B), visually highlighting a key element (block 308C), displaying information corresponding to playing a wagering game (block 308D), and/or providing second content (block 308E). Some embodiments may further optionally include displaying content on a first game window and a second game window (block 370), increasing the frequency that a symbol is displayed (block 312), generating outcomes that are near misses (block 314), moving a key element (block 316), generating an anticipation event (block 318), displaying the first game window and the second game window (block 320), receiving first and second gaze direction data (block 322), and/or receiving interest data (block 324).

Figure 5:
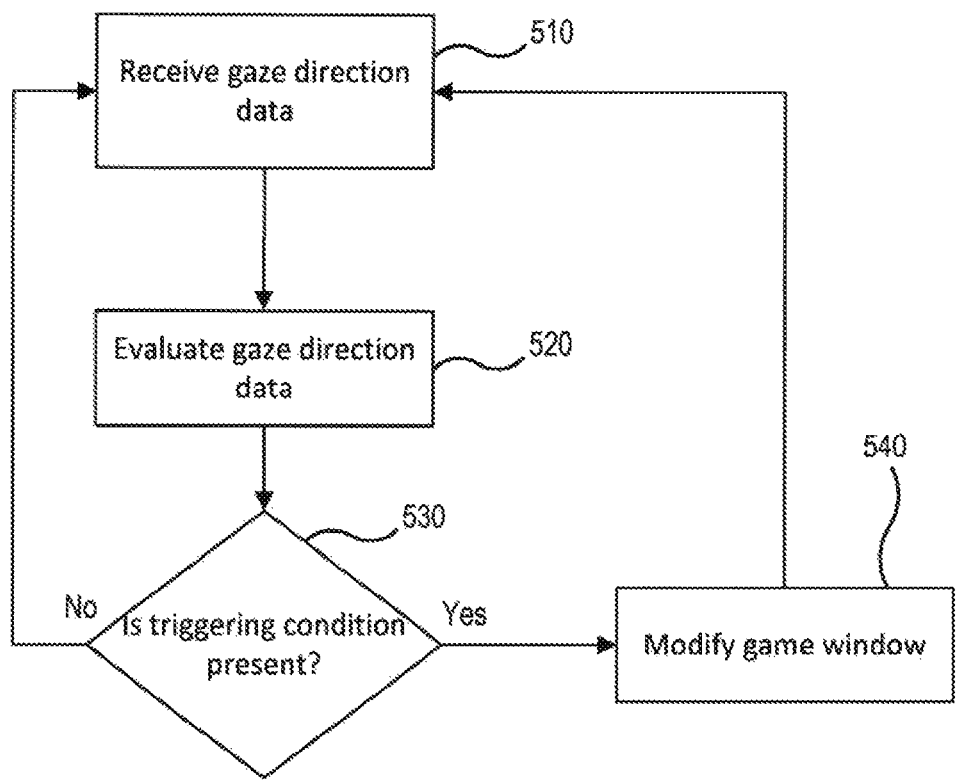
FIG. 5 is a flowchart diagram of operations for performing a method implemented by an electronic gaming machine (EGM) according to some embodiments.

Using gaze detection to alter the timing of various game elements may improve the player's experience. For example, reference is now made to FIG. 5, which is a flowchart diagram of operations for performing a method implemented by an electronic gaming machine (EGM) according to some embodiments. Operations begin by receiving gaze direction data (block 510). Once the gaze direction data is received, it may be evaluated to determine a triggering condition (block 520). If the triggering condition is not present (block 530), then the EGM 10 may continue to receive and evaluate gaze direction data. If the triggering condition is present (block 530), then the game window may be modified (block 540).

In some embodiments, the triggering condition that corresponds to the gaze direction data may indicate that the player is not looking at the electronic display screen 12, 14 while the game window is being displayed. In such embodiments, modifying the game window may include reducing the game cycle time by reducing a time corresponding to at least one game feature. For example, if the player is not watching the game screen, the game cycle time may be reduced. For example, a typical game cycle may be about 4 seconds. In the event that the player is distracted from the game, increasing the rate may increase the excitement for the player and increase his/her attention level to the game. Additionally, if the player is occupied with other tasks and only engaged at a superficial level, such as merely pressing the bet button, the game cycle may be reduced. Reducing the game cycle may be performed across the board reducing the times of substantially all events in the game cycle or may be performed selectively by reducing or eliminating specific different game elements.

In some embodiments, the triggering condition that corresponds to the gaze direction data may indicate that the player is not looking at a game feature such as a video game element on the game window such as an animation, movie, and/or image sequence. In such embodiments, modifying the game window may include reducing the duration of the game feature. For example, if the player is not looking at the game feature, the game feature can be sped up and/or truncated to end more quickly. This could be used for any animation or sequence. If the player is not watching the animation, movie, or sequence, the duration may be reduced and game play may speed up. In some embodiments, the game window may display a "win" animation 3 times and then proceed to the next part of the game. However, if the player is not looking at the animation, the game window may only display the animation one time.

Some embodiments provide that if the gaze direction data indicates that the player is looking at a particular game feature, the time of that game feature could be extended to play longer. In this manner, the player may enjoy the game feature that they are interested in.

Some embodiments provide the game feature may pause while the player is looking at it. The paused state may continue for a particular amount of time or until the player stops looking at the game feature. This may be advantageous for game features including text or instructional elements. Some embodiments provide game features that correspond to game transitions that may occur between base and bonus games may be accelerated or eliminated responsive to determining that a player is not looking at such transitions. Additionally, celebratory credit and win meter roll-up game features may be accelerated responsive to the player not watching.

In some embodiments, the game feature may correspond to a particularly attractive win. In such embodiments, the initiation such game feature may be delayed and/or paused until the player is determined to be watching. Some embodiments provide the EGM 10 may produce an audible alert to the player to get the player to look at the game window before playing the game feature.

In some embodiments, a game element may be configured to move across the display window at a given speed. The triggering condition that corresponds to the gaze direction data may indicate that the player's gaze is moving at a speed that is different from the speed of the game element. In such embodiments, modifying the game window may include changing the speed of the game element to match or substantially match the speed of the player's gaze. In the case that the gaze direction data indicates that the player is not looking at the moving game element, the speed of the moving game element may be increased.

For example, some game animations, such as an element moving across the screen, may attract the player's attention and may be designed to move at a particular rate that the designer views as natural. Some games include a slot symbol that pops off the reels and moves to another location. The gaze direction data may be used to determine the speed of the player's gaze and match it relative to the location of the moving element. In response, the movement speed of the element may be adjusted to match the player' gaze.

Another example of a moving game element includes a symbol expansion event that may occur when one or more symbol types are spread across the game window in various ways. Since the expansion may affect game evaluation, the speed of the symbol expansion may be adjusted to match the speed of the player's gaze.

Some embodiments provide that a win animation may be played for several loops with sound and then the sound may be eliminated Eliminating the sound may be based on an assumption that the player has seen the animation and thus the sounds can be stopped thereafter. In response to a new player playing the EGM 10, the animation sound may be played again. Some embodiments provide that sounds may only be played responsive to the gaze direction data indicating that the player is looking at the animation. Some embodiments provide that the game window may be modified to stop or pause any animation that the player if not looking at based on the gaze direction data. In some embodiments, animations may be selected based on whether the player is looking. In some embodiments, the game window may be modified and/or configured to enhance animations when the player is looking at them. For example, in the case that there are multiple animations that are playing from corresponding different payline wins, the animations may each include a basic animation and an elaborate animation. Responsive to the gaze direction data indicating that the player is not looking at a given animation, the basic version of that animation may be displayed. Animations that the player is watching may use the elaborate animation, that may include funny and/or more interesting content.

Figure 6:
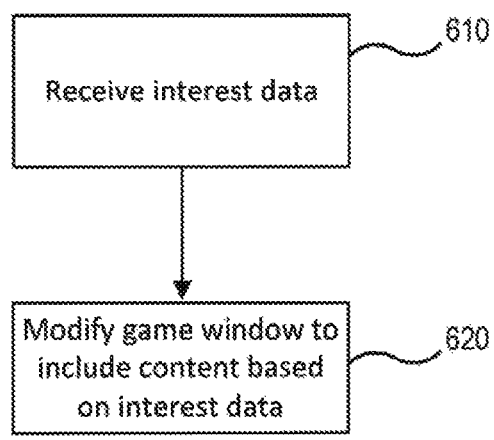
FIG. 6 is a flowchart diagram of operations for performing a method implemented by an electronic gaming machine (EGM) according to some embodiments.

Since the gaze direction data may determine a point or area that a player is looking, then it can also detect whether the player is looking up, down and/or not at the game window. Such information may be used to gauge player interest, which may be advantageous in operating the EGM 10. Reference is now made to FIG. 6, which is a flowchart diagram of operations for performing a method implemented by an electronic gaming machine (EGM) according to some embodiments. Methods may include receiving interest data that may be determined based on gaze direction data (block 610). In some embodiments, the interest data may be collected and stored in a database that may be within the EGM 10 and/or may be external to the EGM 10. The interest data may correspond to multiple different game elements and/or features. Responsive to receiving the interest data, the game window may be modified to include content that the interest data indicates may generate a positive response and/or experience for the player (block 620).

Figure 7:
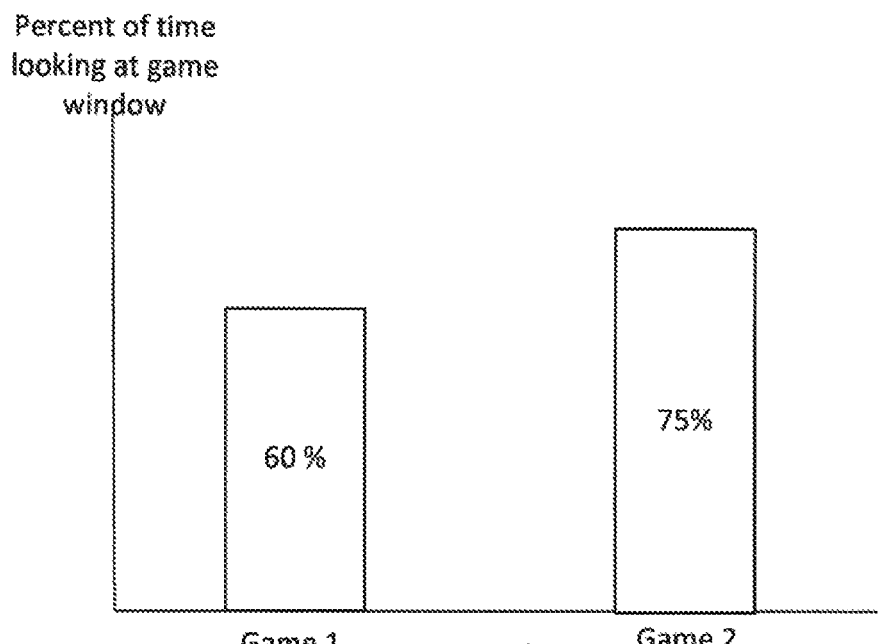
FIG. 7 is a bar graph illustrating an example comparing the amount of time a player looks at first and second game content according to some embodiments herein.

Some embodiments provide that the amount of time player looks at the game window may be a gauge of interest. Reference is now made to FIG. 7, which is a bar graph illustrating an example comparing the amount of time a player looks at first and second game content according to some embodiments herein. As illustrated, the player may look at the game window of Game 1 for 60% of a time interval having a given value and the game window of Game 2 for 75% of another time interval having the given value. A greater amount of time looking at the game window of game 1 may be used to determine a higher level of interest in Game 1 relative to Game 2.

Figure 8A:
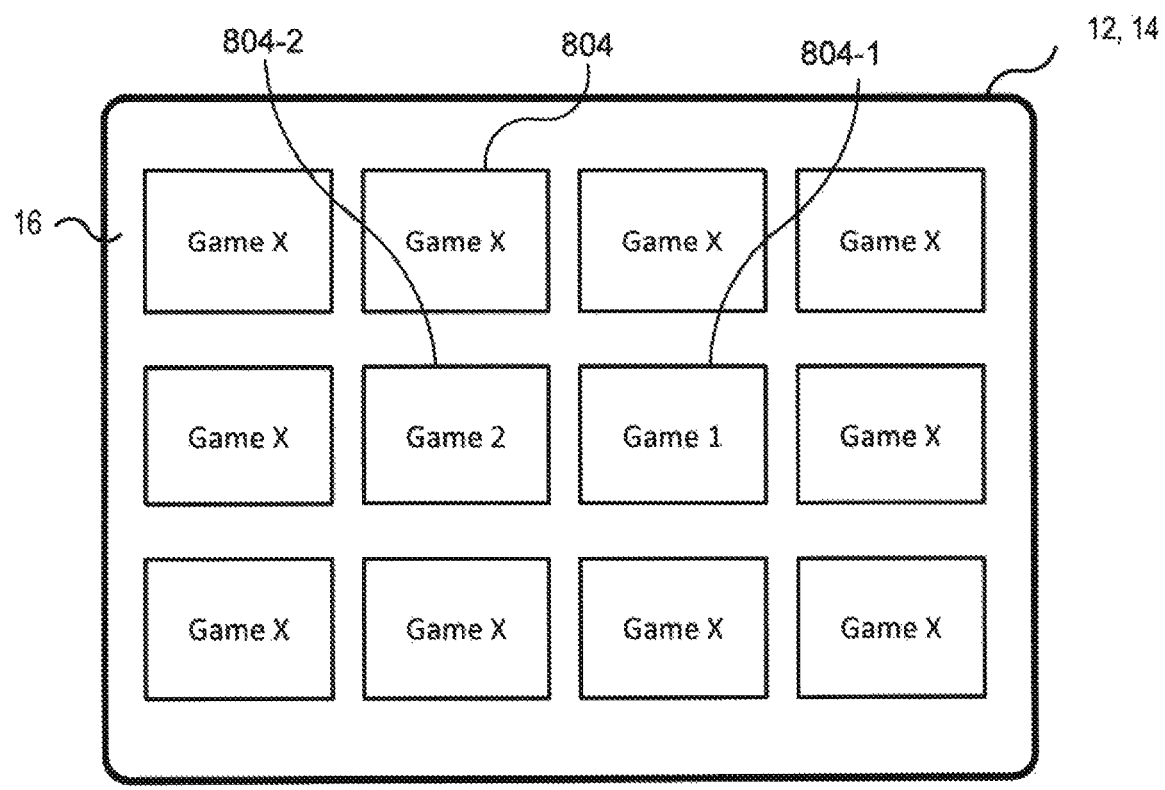
FIGS. 8A and 8B are schematic block diagrams illustrating a game window including a chooser before and after, respectively, receiving the interest data according to some embodiments.
Figure 8B:
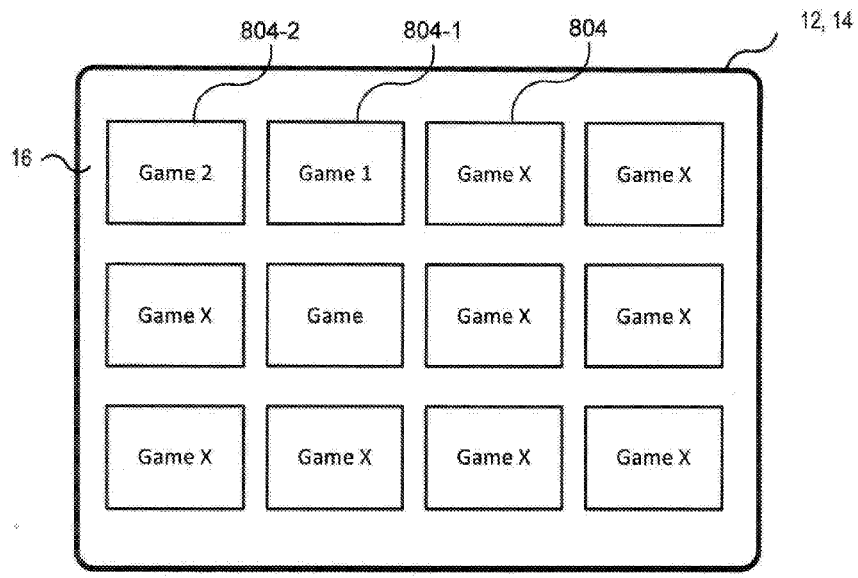

In some embodiments, a game window may include a chooser that includes links and/or identities of multiple different games that may be selected by the player. For example, reference is made to FIGS. 8A and 8B, which are schematic block diagrams illustrating a game window including a chooser before and after, respectively, receiving the interest data according to some embodiments. As illustrated in FIG. 8A, the electronic display screen 12, 14 may display a game window 16 that includes game links (e.g., icons) 804 to multiple different games that may be selected by the player. The game links 804 may include game links 804-1 and 804-2 that correspond to Game 1 and Game 2 provided in the example of FIG. 7. Before receiving the interest data, game links 804-1 and 804-2 may be presented along with other game links 804 in an arrangement that does not reflect any difference in appeal to the player. Some embodiments provide that the games presented on the chooser may be organized based on the interest identified using the gaze direction data. For example, games with the most interest may be shown most frequently and/or displayed first in the chooser. Referring to FIG. 8B, in response to receiving the interest data, the displayed order of game links 804-1 and 804-2 may be modified to bring the game link 804-2 corresponding to Game 2 to a more prominent position in the game window 16. In some embodiments, a database may store data corresponding to player interest relative to other factors, such as age and/or gender. Some embodiments provide when a new player sits down player's age and gender may be determined. The chooser game window 16 can display the most likely games this new player will like automatically based on the associations in the database. Some embodiments provide that the interest data may be received from a database that is external to the EGM 10.

In some embodiments, when a player sits down at the EGM 10 the gaze direction data may determine which game link the player looks at first. Interest data corresponding to that gaze direction data may be used as a triggering condition to modify the game window.

Some embodiments provide that interest data may be used to identify content that the player finds interesting or expressly not interesting. In such embodiments, the game window may be modified to include or exclude various game elements based on the interest data. Game elements may include game feature type, game element category, game theme, colors and graphics properties, among others.

Some embodiments provide gaze direction data may determine that a player is gazing at the credit meter more often and/or for longer periods of time. This may be an indication that the player is losing interest because the player is losing money and focusing on the amount of money left on the machine. In response, additional bonus games may be provided to rejuvenate the player's interest.

In some embodiments, gaze direction data may be used to determine a player's falling interest in a game by measuring the rate of change in interest over time. For example, a player playing a new game may look at the game window for 9 minutes of the first 10 minutes of game play. However, the player may only look at the game window for 6 minutes of the following 10 minutes. In response to the triggering condition of losing interest, the game window may be modified to present a new game, new feature, different theme, different color, and/or different paytable, among others. In some embodiments, gaze direction data may indicate that interest is increasing.

Figure 9:
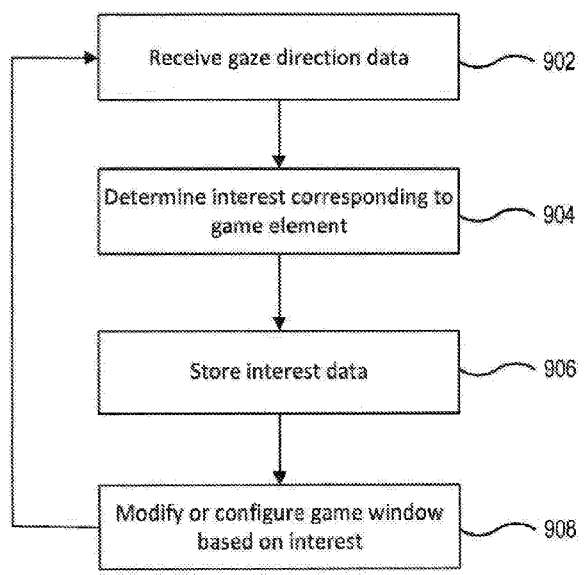
FIG. 9 is a flowchart diagram of operations for performing a method implemented by an electronic gaming machine (EGM) according to some embodiments.

Some embodiments provide the gaze direction data may detect game elements that the player looks at, including the duration and/or frequency of the gaze corresponding to such game elements, to determine interest corresponding to each element. For example, reference is now made to FIG. 9, which is a flowchart diagram of operations for performing a method implemented by an electronic gaming machine (EGM) according to some embodiments. Gaze direction data is received (block 902). In some embodiments, the interest data corresponding to the game elements is determined (block 904). The interest data corresponding to the game elements for a player may be stored in a database or other data repository (block 906). The database may store the category of a game element such as, for example, that the player likes sports symbols, symbols with men/women in them, and/symbols that are patriotic. The database may store that the player likes other things such as a color, a theme, certain graphics and/or graphics styles, and/or game element size. Graphics may include a collection of colors, a particular culture, theme and/or sound, among others.

As an example, the interest data may indicate that the player likes sports symbols and therefore the game window is configured to present sports symbols during the bonus games. Similarly, if the interest data indicates that a player likes poker cards, the game window may be configured to offer a poker themed bonus game. Still further, if the interest data indicates that the player likes the color blue and images of men/women, the game window may be modified and/or configured to include base or bonus games with a blue background and slot symbols that include images of women. In addition to visual configurations, game sounds may be configured and/or modified responsive to the interest data.

The game window may be modified and/or configured based on the interest data stored in the database for a given player (block 908). For example, the game window may be modified to offer games, features, sounds, paytables, etc. that match the player's interest. In this manner, new and/or modified configurations (feature, paytable, game, etc.) may be provided. Some embodiments provide the game window may be modified for base game and/or for bonus games.

Further, once a game window is modified, gaze direction data may be used to determine if the interest has changed in response to the modifications. Some embodiments provide that, responsive to the interest data indicating a negative response to a game element, the game window may be configured and/or modified to reduce and/or remove such game elements. For example, if the player never looks at the gold coin symbol it could be removed from the game and/or from the bonus round graphics.

Figure 10:
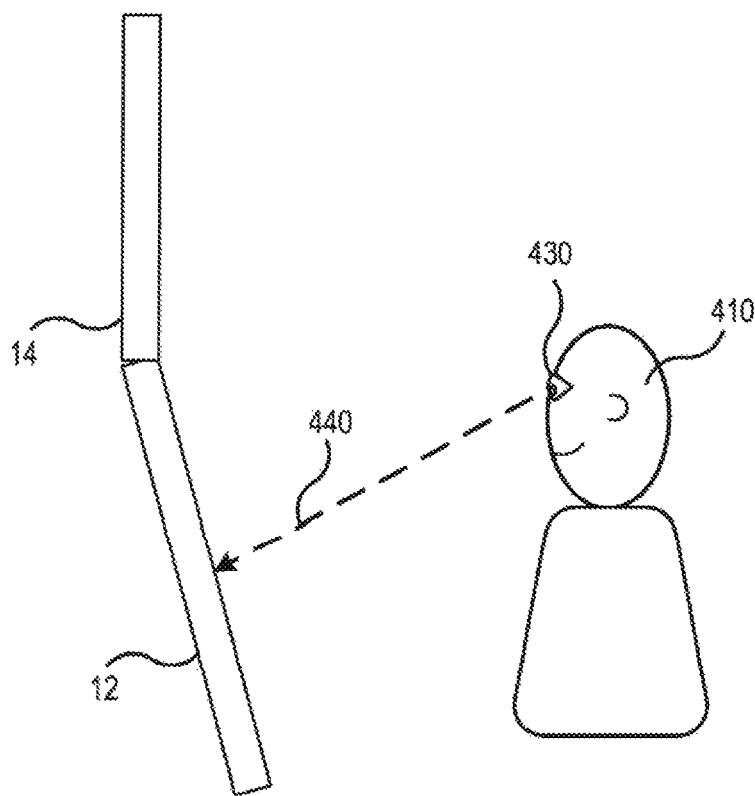
FIG. 10 is a schematic diagram illustrating the mapping of a player's eye gaze to the viewing area in embodiments including multiple electronic display screens.

As discussed herein, the EGM 10 may include multiple electronic display screens 12, 14. Reference is now made to FIG. 10, which is a schematic diagram illustrating the mapping of a player's eye gaze to the viewing area in embodiments including multiple electronic display screens 12, 14. In some embodiments, a first game window is displayed on a first electronic display screen 12 and a second game window is displayed on a second electronic display screen 14. Some embodiments provide that a data capture camera device (not shown here) is provided for each of the first and second electronic display screens. As such, first gaze direction data may be received corresponding to the first electronic display screen 12 and second gaze direction data may be received corresponding to the second electronic display screen 14.

In some embodiments, the second game window may be modified and/or configured responsive to whether the player is looking at the first electronic display screen 12 or the second electronic display screen 14. For example, responsive to the gaze direction data indicating that the player is looking at the second electronic display screen 14, the second game window may be modified and/or configured to display player and/or game state information corresponding to the player. However, responsive to the gaze direction data indicating that the player is looking at the first electronic display screen 12, the second game window may be modified and/or configured to provide content that is unrelated to the current game state and/or player. For example, the second game window may be configured to display content appropriate for bystanders, such as, for example, advertisements for a show, restaurant or casino attraction, information about other similar EGMs that are available for play, information to attract the bystander to become a new player, and/or an overview of the player's game information so the bystander can observe the player's game without being in an immediate proximity to the player.

Some embodiments provide that a bonus game may be displayed on the second game window and that the gaze direction data may indicate that the player is not looking at the second electronic display screen 14. In such embodiments, the first lower game window may be modified and/or configured to include a message instructing the player to look up at the second electronic display screen 14. Additionally, the message may be removed from the game window once the gaze direction data indicates that the player has looked at the second game window.

Although two electronic display screens 12, 14 are discussed above, some embodiments include more than two electronic display screens, including a main display screen, a digital player panel screen, a top display screen and/or a topper display screen, among others.

Figure 11:
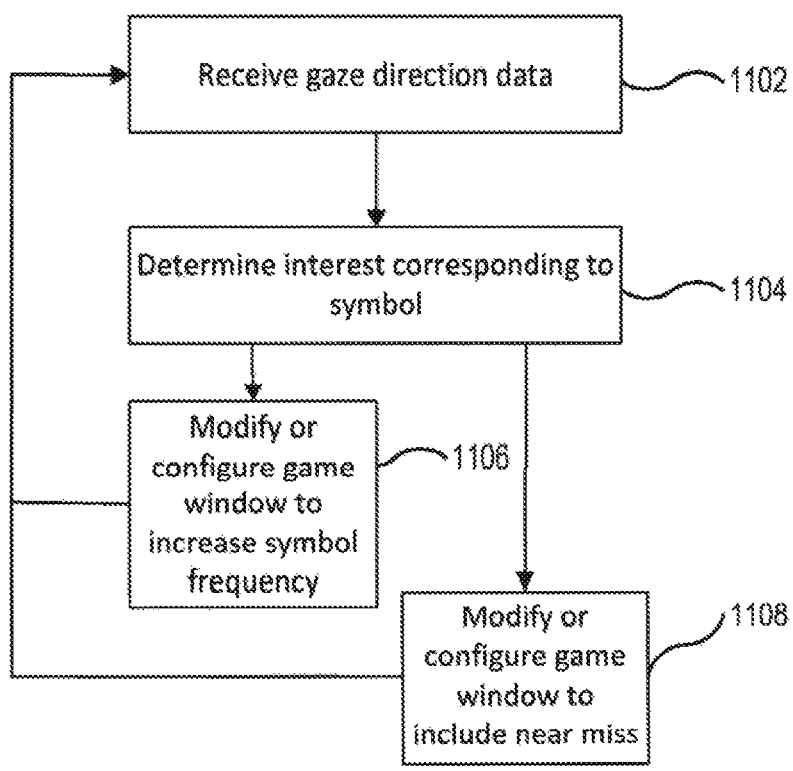
FIG. 11 is a flowchart diagram of operations for performing a method implemented by an electronic gaming machine (EGM) according to some embodiments.

When the player starts a slot game, the reels spin and the reel spin animation is started. Some embodiments provide that gaze direction data may indicate a player's preference corresponding to particular symbols displayed in the reel spin animation. For example, reference is now made to FIG. 11, which is a flowchart diagram of operations for performing a method implemented by an electronic gaming machine (EGM) according to some embodiments. As the reel spin animation is being displayed, gaze direction data is received (block 1102). In some embodiments, the interest data corresponding to a particular symbol in the reel spin animation is determined (block 1104). Some embodiments provide that the game window may be modified and/or configured to increase a frequency that the given symbol is displayed during the spin animations (block 1106). In this manner, the game window may show the reel spin animation that includes the particular symbol more often. This may give the impression that the corresponding bonus is more likely to be triggered when the reels stop. Some embodiments provide the game could add 10% or 20% more of the particular symbol to increase player interest and excitement. In some embodiments, the game window may be modified and/or configured to weight the particular symbol during a spin animation to generate outcomes that are perceived by the player as near miss events that include the particular symbol (block 1108).

Some games may include key elements that may be important for the player to know about. In some embodiments, gaze direction data may provide an indication as to whether a player has seen these key elements. For example, a driving game may include a left turn button on the left of the screen and a right turn button on the right of the screen. If the player doesn't see these buttons the game play experience may suffer for the player because the player may not be able to drive during such game. In response to evaluating the gaze direction data and determining that the player has not seen a key element, the game window may be modified to include additional graphics, text and/or highlighting to attract the player to the key element. In some embodiments, the game play may be paused and/or delayed until the gaze direction data indicates that player has seen all key visual elements. This may be especially important in a skill bonus.

Another example of a key element includes information regarding a player's account and/or credits. For example, the player may insert a ticket into the bill acceptor that only includes non-cashable credits that the player is expected to play. The game window may be modified and/or configured to make sure the player sees that non-cashable credits were accepted before allowing the player to start the game. In this manner, confusion may be avoided. In some embodiments, the player may be offered a skill or other choice. In such embodiments, the gaze direction data may indicate that the player has read that the game will be a skill game before allowing the game to start. Some embodiments provide the skill game will delay starting until the player is looking at the game window.

Typically, key elements may be displayed on a main display screen and may include game elements and/or regulatory elements. Examples of regulatory elements include a credit meter, wager amount and/or door status, among others. Regulations may require that these are displayed to the player. In some embodiments, responsive to gaze direction data indicating that a player is looking at a given location, the key elements may be moved to that location and/or copied to that location. For example, when the player looks down at a digital player panel display screen to adjust a wager, the game window may be modified to display the credit meter proximate the wager buttons so the player knows how much he or she can bet.

Many games played in EGMs 10 may include an anticipation element. For example, slot games may provide that the first three reels stop with three of the same symbols and the EGM 10 plays an anticipatory sound and/or delays the stopping of the remaining two reels. The anticipation effect may be further enhanced by using gaze direction data to determine that a player is watching a particular reel intensely. For example, some embodiments provide that the anticipation element may be started responsive to the gaze direction data. For example, in the instance where the player is watching the last reel, the last reel may take longer to stop and/or an anticipatory sound may be played. Some embodiments provide the anticipatory sound and/or animation may start and wait for the player to look at the anticipation reel before stopping that reel.

In some embodiments, the gaze direction data may indicate which reel the player is looking at and stop it last or make its reel spin last longer. For example, if the player is looking at the left most reel, the reels may stop right to left so that the left reel stops last. Or if the player is looking at the middle reel all the other reels could stop normally and then the middle reel could stop.

Some embodiments provide that the EGM 10 may be configured to communicate with mobile devices, such as smartphones, tablets and the like using wireless communication technologies. In some embodiments, mobile devices may be equipped with gaze and/or facial recognition. If the mobile device software detects that the player is looking at the mobile device, the EGM 10 may receive a message from then mobile device that indicates that the player is looking at the mobile device and not the gaming window. In some embodiments, the EGM 10 may use this information when determining player interest in the current game and/or type of game and modify the game window to alter the experience to more effectively engage the player.

Some embodiments provide that responsive to the player looking at the mobile device, the game window may be modified and/or configured to speed up animations and/or game cycle times. In some embodiments, the game window may be modified and/or configured to attract the player back to the EGM 10, using, for example, an attraction sound, special animation, and/or a fun feature and/or bonus. In some embodiments, the EGM 10 may communicate with the mobile device to offer the player an option to play the game and/or a bonus on the mobile device.

As described above, gaze direction data may be evaluated to determine player interest in games and/or game elements. Some embodiments provide that an emotional state of the player may be determined by evaluating the gaze direction data. For example, if the gaze direction data indicates that a player is looking all around the game window, it may be determined that the player is in a confused state and/or is searching for something. In response to this determination, the game window may be modified and/or configured to include an informational prompt to provide the player with instructions. For example, if the EGM 10 offers a player with skill options and the player responds by looking around the display screen or at other display screens, then the gaze direction data may indicate that the player is confused about the skill options. In response, the game window may be modified to prompt the player with additional information such as bonus play instructions and/or hints.

Some embodiments provide that the gaze direction data may identify basic eye movements that may be used to understand the state of the player. For example, looking up may be interpreted as the player thinking and the EGM 10 may use that information to determine the player is trying to determine what to do. In another example, looking down may be used to determine loss of interest in the game.

Some embodiments provide that player facial image data captured using a data capture camera device may be used to determine the emotional state. For example, numerous different software applications may determine various mood parameters from an image. Such parameters may be used in the determination of player interest in a game and/or game element. Some embodiments provide that a lookup table may be generated and/or accessed that provides various parameters such as age, gender, and/or emotional state (e.g., angry, happy, sad, bored, etc.) that may be associated with game and/or game elements. The parameters may be measured for a player and then the lookup table may be accessed to determine the player's interest or lack thereof. Responsive to receiving the data from the lookup table, the game window may be modified to include and/or exclude game elements and/or game features.

Figure 12:
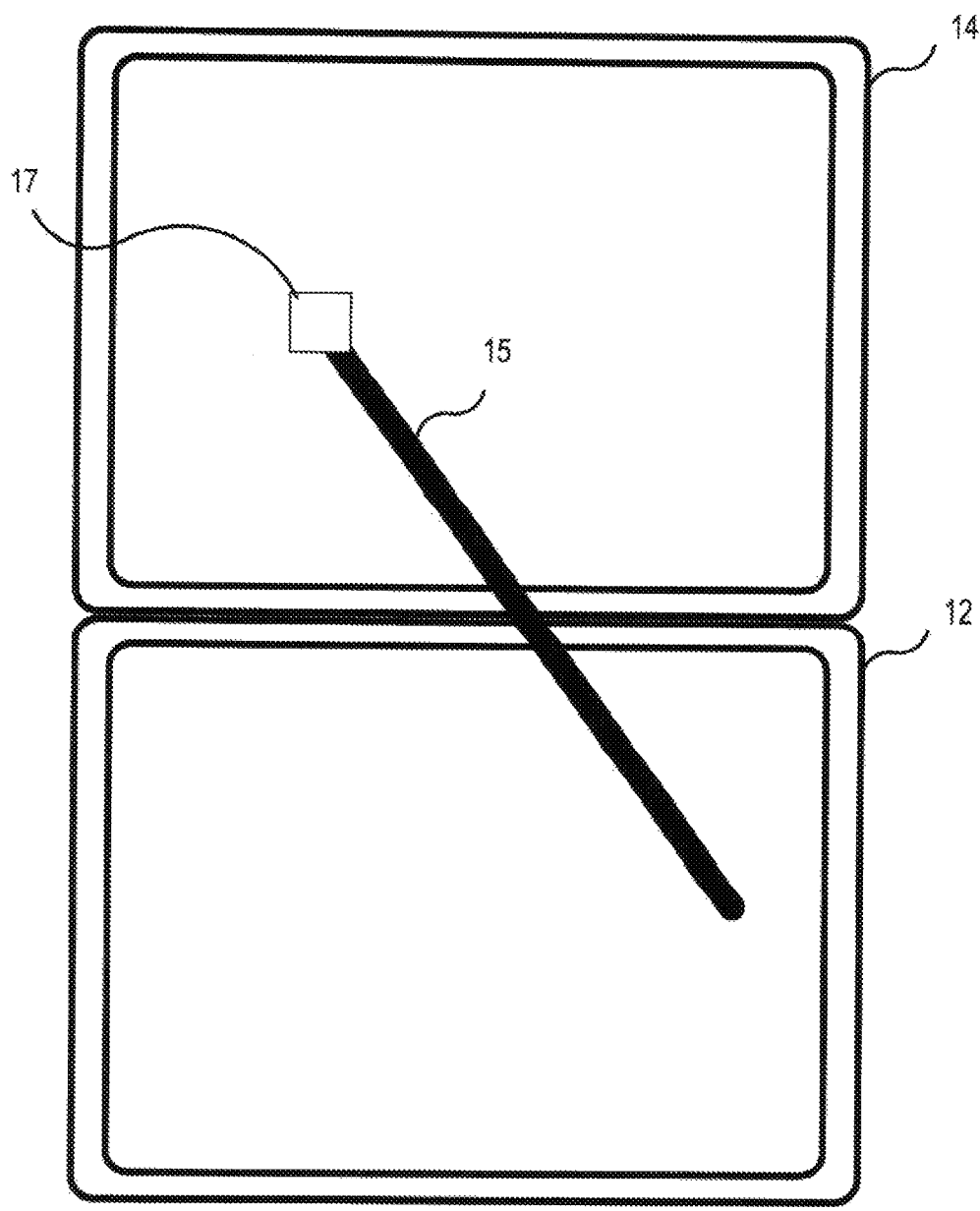
FIG. 12 is a schematic block diagram illustrating a front partial view of first and second electronic display screens 12, 14 according to some embodiments herein.

In some embodiments, gaze direction data may be generated for multiple electronic display screens 12, 14. In some embodiments, gaze direction data corresponding to a first electronic display screen may be used to calibrate data corresponding to a second electronic display screen 14. For example, reference is now made to FIG. 12, which is a schematic block diagram illustrating a front partial view of first and second electronic display screens 12, 14 according to some embodiments herein. In some embodiments, the gaze direction data corresponding a first electronic display screen 12 may be used to calibrate the second electronic display screen 14. In some embodiments, the game window may display a game element 17 or other object to move along a generally linear path 15 that starts on the second electronic display screen 14 and extends to the first electronic display screen 12. The gaze direction data may indicate that the player is looking at the game element 17, which provides the indication regarding which of the first and second electronic display screens is on top and which is on bottom, which may be advantageous in configuring the EGM 10.

As the game element 17 is moving downward, the game element passes from the second electronic display screen 14 to the first electronic display screen 12. At that point, gaze direction data corresponding to each of the first and second electronic display screens 12, 14 should include x,y coordinate data that has about the same "x" value. Responsive to the "x" values being different, one of the electronic display screens may be calibrated so the gaze direction data is consistent from one to the other.

In some embodiments, the player may look from the second (top) electronic display screen 14 to the first (bottom) electronic display screen 12 as the game element moves down. It will take a small amount of time for the player's eyes to move from the second (top) electronic display screen 14 to the first (bottom) electronic display screen 12. That time may be proportional to the amount of space between the second (top) electronic display screen 14 and the first (bottom) electronic display screen 12. The space may be due to the physical distance between the second (top) electronic display screen 14 and the first (bottom) electronic display screen 12 and/or the thickness of the bezels. In this regard, the time value may be used to estimate We can use that time to determine how far apart the first and second electronic display screens 12, 14 are, which may be advantageous in determining how games display information therebetween.

Further Example Embodiments

In some embodiments, the data capture camera device 25 and the display device 12, 14 may be calibrated by game controller 44 and display controller 52, for example, by displaying a single image or icon, such as a target, on the screen and calling the player's attention to the target. The data capture camera device 25 then collects eye gaze data from the player as described herein. When the display device 12, 14 is a touchscreen device, the player may be prompted to touch the target on the screen. The player's gaze may be calibrated based on the direction the player was looking immediately prior to touching the screen, on the assumption that the player would look at the target immediately prior to touching it.

Figure 13:
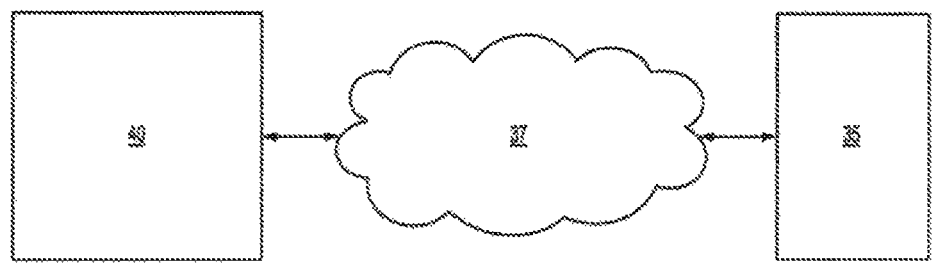
FIG. 13 is a schematic diagram of an example online implementation of a computer system and online gaming system according to some embodiments.

FIG. 13 illustrates an online implementation of a gaming system that may continuously monitor the eye gaze of a player as described herein. The gaming system may be an online gaming device (which may be an example implementation of an EGM). As depicted, the gaming system includes a gaming server 40 and a gaming device 35 connected via a network 37. The eye gaze of the player may be monitored and/or predicted by the gaming device 35 such that data relating to tracked positions, trajectories, etc. may be obtained as described herein.

In some embodiments, the gaming server 40 and the gaming device 35 cooperate to implement the functionality of EGM 10, described above. So, aspects and technical features of EGM 10 may be implemented in part at the gaming device 35, and in part at the gaming server 40.

The gaming server 40 may be configured to enable online gaming, and may include game data and game logic to implement the games and enhancements disclosed herein. For example, the gaming server 40 may include a player input engine configured to process player input and respond according to game rules. The gaming server 40 may include a graphics engine configured to generate the interactive game environment as disclosed herein. In some embodiments, the gaming server 40 may provide rendering instructions and graphics data to the gaming device 35 so that graphics may be rendered at gaming device 35.

The gaming server 40 may also include a movement recognition engine that may be used to process and interpret collected player eye gaze data, player eye gesture data, and player movement data, to transform the data into data defining manipulations and player interaction commands.

The network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

The gaming device 35 may be particularly configured with hardware and software to interact with the gaming server 40 via the network 37 to implement gaming functionality and render 2D or 3D enhancements, as described herein. For simplicity, only one gaming device 35 is shown but an electronic gaming system may include one or more gaming devices 35 operable by different players. The gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features of the EGM 10 may be implemented using the gaming device 35.

The gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

The gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The gaming device 35 may be operable to register and authenticate users (using a login, unique identifier, and password for example) prior to providing access to applications, a local network, network resources, other networks and network security devices. The computing device may serve one user or multiple users.

The gaming device 35 may include one or more input devices (e.g. player control inputs 50), such as a keyboard, mouse, camera, touch screen and a microphone, and may also include one or more output devices such as a display screen (with 3D capabilities) and a speaker. The gaming device 35 has a network interface in order to communicate with other components, to access and connect to network resources, to serve an application and other applications, and perform other computing applications.

The gaming device 35 connects to gaming server 40 by way of network 37 to access technical 2D and 3D enhancements to games as described herein. Multiple gaming devices 35 may connect to gaming server 40, each gaming device 35 operated by a respective player.

The gaming device 35 may be configured to connect to one or more other gaming devices through, for example, the network 37. In some embodiments, the gaming server 40 may be utilized to coordinate the gaming devices 35. Where gaming devices 35 may be utilized to facilitate the playing of a same game, such as an interactive game, wherein the interactive game includes at interaction between activities performed by the players on the gaming devices 35, various elements of information may be communicated across the network 37 and/or the server 40. For example, the elements of information may include player eye gaze data, player eye gesture data, player movement data, and/or the viewing area displayed on the gaming device 35. This information may be used by each of the gaming devices 35 to provide and/or display interfaces that take into consideration the received data from another gaming device 35. The gaming devices 35 may be configured for cooperative and/or competitive play (or a combination thereof) between the players in relation to various game objectives, events, and/or triggers.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data collected by the data capture camera device 25 and updating the rendering of the viewing area, determines that the player eye gaze meets the filter movement threshold. The data capture camera device 25 may collect player eye gaze data.

The game controller 44 may process the player eye gaze data to correspond with a location on the viewing area. The game controller 44 may determine where the player is looking at on the viewing area based on a certain number of previously recorded player eye gaze data, for example, by tracking the last ten eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where the EGM 10 may be used may have a variety of lighting conditions. For example, the EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the data capture camera device 25 may be an infrared data capture camera device. The infrared data capture camera device may collect player eye gaze data, player eye gesture data, and player movement data without being affected by the lighting conditions of the locations where EGM 10 may be used. In some embodiments, the EGM 10 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 10 may be used.

A player that plays an interactive game using EGM 10 may be wearing glasses. The glasses of the player may cause refractions of the light that illuminates the player. This may affect the data capture camera device 25 while it monitors the eye gaze, eye gesture, and/or movement of the player. Glasses that comprise an infrared filter may also interfere with or affect the data capture camera device 25 while it monitors the eye gaze, eye gesture, and/or movement of the player. The EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the data capture camera device 25, that the light illuminating the player may be refracted, and may determine that the player is wearing glasses. When EGM 10 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 12, 14. The ability for game controller 44 to predict the location of the eye gaze of the player at a future time may be useful to rule out inaccurate readings. For example, while a player plays a game, the data capture camera device 25 may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect. As another example, by predicting the location of the eye gaze, the display controller 52 may adjust the resolution of the display device 12, 14 where the player is not expected to be looking.

In some embodiments, the EGM 10 may apply one or more predictive techniques to develop a plurality of predicted points of eye gaze, which, for example, may approximate and/or estimate where a player's gaze will travel next. These predictions may also be provided for use by graphics processor 54 and/or game controller board 44 in relation with smoothing out and/or accounting for removal of transient readings, undesirable artefacts and/or inadvertent gaze positions. In some embodiments, the predictions may also be used to improve the performance of EGM 10 in relation to gaze capture and/or processing thereof, by, for example, applying heuristic techniques to reduce the number of computations and/or capture frequency by relying on predictions to interpolate and/or extrapolate between gaze positions captured.

For example, when a player looks at a location of a viewing area in an interactive game, the EGM 10 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 10 could reduce the frequency of the gaze system updates and use the recorded pathing and final location to be used to reduce the overall computing resources required, for example (e.g., performing various steps of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 10, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered.

In some embodiments, the player may play an interactive game with EGM 10 in communication with a mobile device. Depending on the game data of the interactive game, the player may play the interactive game on EGM 10, on the mobile device, or on both. The player may play the interactive game using their eye gaze, eye gestures, movement, the interface of the mobile device, or any combination thereof. The player may play the interactive game using only the eye gaze of the player while the player holds on to the mobile device with one or more hands. The mobile device may, for example, be a computer, personal digital assistant, laptop, tablet, smart phone, media player, electronic reading device, data communication device, or a wearable device, such as Google™ Glass, virtual reality device, or any combination thereof. The mobile device may be a custom mobile device that may be in communication with EGM 10. The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

The EGM 10 may include a wireless transceiver that may communicate with the mobile device, for example using standard WiFi or Bluetooth, or other protocol based on the wireless communication capabilities of the mobile device. The player may be able to play the interactive game while the mobile device is in communication with EGM 10. When connected to the EGM 10, the viewing area may be displayed on display device 12, 14 or on the screen of the mobile device, or both. The data capture camera device 25 on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player does not have to physically go to EGM 10 to set up the link and play the interactive game associated with EGM 10.

The host system 41 may store account data for players. The EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller board 44 and graphics processor 54 may be a single integrated chip.

The EGM 10 may be configured to provide one or more player eye gaze, eye gesture, or movement interactions to one or more games playable at EGM 10. The enhancements may be to a primary interactive game, secondary interactive game, bonus interactive game, or combination thereof.

As shown, the EGM 10 may include a card reader 34 to identify a monetary amount conveyed by a player to the electronic gaming machine.

The EGM 10 may include at least one data storage device storing game data for at least one interactive game or at least one bonus interactive game, or both.

The EGM 10 may include graphics processor 54 to generate an interactive game environment and define a viewing area as a subset of the interactive game environment. The viewing area may have a plurality of game components based on the game data.

The EGM 10 may include display device 12, 14 to display via a user interface the viewing area having the plurality of game components.

The EGM 10 may include display controller 52 to control rendering of the viewing area on the display device 12, 14 using the graphics processor 54.

The EGM 10 may include at least one data capture camera device to continuously monitor eye gaze of a player to collect player eye gaze data.

The EGM 10 may include a game controller 44 for determining a location of the eye gaze of the player relative to the viewing area using the player eye gaze data and triggering a control command to the display controller 52 to dynamically update the rendering of the viewing area based on the player eye gaze data.

In response to detection of the control command, the display controller 52 controls the display device 12, 14 in real-time or near real-time using the graphics processor 54 to dynamically update the rendering of the viewing area to provide a real-time or near real-time graphical animation effect displayed on the display device 12, 14 representative of a visual update to the visible game components in the viewing area, the visual update based on the player eye gaze data.

In response to an outcome of the interactive game, the card reader 34 updates the monetary amount.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, any hardware and/or software disclosed herein may be configured to perform any steps and/or operations described herein including those corresponding to methods described herein.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be example only.

What is claimed is:

1. A method of operating an electronic gaming machine, comprising:
    operating a wagering game on the electronic gaming machine, wherein operating the wagering game on the electronic gaming machine comprises:
    displaying a game window associated with the wagering game on an electronic display screen of the electronic gaming machine, the game window including a game element;
    receiving, using at least one data capture camera device, gaze direction data that corresponds to a player and that includes information corresponding to a location towards which a gaze of the player is directed;
    evaluating, using a processor, the gaze direction data to determine a triggering condition corresponding to the game element; and
    modifying, using the display device, the game window responsive to determining the triggering condition that is based on the gaze direction data; and
    determining, based on the gaze direction data, an emotional state of the player that corresponds to the player looking at the game element,
    wherein, responsive to determining that the player has a positive emotional state corresponding to the game element, modifying the game window to increase a presence of the game element, and
    wherein, responsive to determining that the player has a negative emotional state corresponding to the game element, modifying the game window to reduce the presence of the game element.

2. The method according to claim 1, wherein the game element includes a first timing characteristic,
    wherein the first timing characteristic comprises a game cycle time that is a time duration corresponding to a single play of the wagering game,
    wherein the triggering condition corresponds to the gaze direction data indicating that the player is not looking at the electronic display screen while the game window is being displayed, and
    wherein modifying the game window comprises reducing the game cycle time by reducing a time corresponding to at least one game feature.

3. The method according to claim 1, wherein the game element includes a first timing characteristic,
    wherein the game element comprises a video that includes an animation, a movie and/or an image sequence that is configured to be displayed for a first time duration,
    wherein the triggering condition corresponds to the gaze direction data indicating that the gaze of the player is not directed at the game element, and
    wherein the method further comprises modifying the first timing characteristic, wherein modifying the first timing characteristic comprises causing the game element to be displayed for a second time duration that is less than the first time duration.

4. The method according to claim 1, wherein the game element includes a first timing characteristic,
    wherein the game element comprises a video that includes an animation, a movie and/or an image sequence that is configured to be displayed for a first time duration,
    wherein the triggering condition corresponds to the gaze direction data indicating that the gaze of the player is directed at the game element, and
    wherein modifying the game window comprises causing the game element to be displayed for a second time duration that is greater than the first time duration.

5. The method according to claim 1, wherein the game element comprises a first speed that corresponds to a rate of speed that the game element moves across the electronic display screen,
    wherein the triggering condition corresponds to the gaze direction data indicating that the gaze of the player is moving across the electronic display screen at a second speed that is different from the first rate of speed, and
    wherein modifying the game window comprises modifying the rate of speed that the game element moves across the electronic display screen.

6. The method according to claim 5, further comprising determining that player is looking at a mobile device,
    wherein modifying the game window comprises including a game element to attract attention of the player or sending the player mobile device a message that provides an option to play the wagering game on the mobile device.

7. The method according to claim 1, wherein the game element comprises a first speed that corresponds to a rate of speed that the game element moves across the electronic display screen,
    wherein the triggering condition corresponds to the gaze direction data indicating that the gaze of the player is not directed to the game element, and
    wherein modifying the game window comprises modifying the rate of speed that the game element moves across the screen to a second speed that is greater than the first speed.

8. The method according to claim 1, wherein the game window comprises a first game window and the electronic display screen comprises a first electronic display screen,
    wherein operating the wagering game further comprises displaying the first game window on the first electronic display screen and a second game window on a second electronic display screen,
    wherein, responsive to the gaze direction data indicating that the gaze of the player is directed to the second game window, displaying content on both the first game window and the second game window that corresponds to the wagering game, and
    wherein, responsive to the gaze direction data indicating that the gaze of the player is not directed to the second game window, displaying content on the first game window that corresponds to the wagering game and displaying content on the second game window that does not correspond to the wagering game.

9. The method according to claim 1, wherein the game window comprises a first game window and the electronic display screen comprises a first electronic display screen,
    wherein operating the wagering game further comprises displaying the first game window on the first electronic display screen and a second game window on a second electronic display screen, and
    wherein, responsive to the gaze direction data indicating that the gaze of the player is directed to the first game window, displaying content on the first game window that communicates a message to the player to look at the second game window.

10. The method according to claim 1, wherein the game window includes a plurality of game elements, wherein ones of the plurality of game elements are spin animations of game reels that each include a plurality of symbols thereon, and wherein, responsive to the gaze direction data indicating that that player has an interest in a given symbol of the plurality of symbols, increasing a frequency that the given symbol is displayed during the spin animations.

11. The method according to claim 1, wherein the game window includes a plurality of game elements, wherein ones of the plurality of game elements are spin animations of game reels that each include a plurality of symbols thereon, wherein, responsive to the gaze direction data indicating that that player has an interest in a given symbol of the plurality of symbols, generating outcomes that are near misses relative to a jackpot, wherein the jackpot comprises the given symbol.

12. The method according to claim 1, wherein the game element comprises a key element that includes information to the player that has a higher value than information corresponding to other game elements, wherein the gaze direction data is evaluated to determine if the player has looked at the key element, and wherein responsive to determining that the player has not looked at the key element, modifying the game window includes visually highlighting the key element to attract attention of the player.

13. The method according to claim 1, wherein the game element comprises a key element that includes information to the player that has a higher value than information corresponding to other game elements, wherein the gaze direction data is evaluated to determine that the player has not looked at the key element, and wherein responsive to determining that the player has not looked at the key element, moving the key element to the location towards which the gaze of the player is directed.

14. The method according to claim 1, wherein the game window includes a plurality of game elements, wherein ones of the plurality of game elements are spin animations of game reels, wherein, responsive to the gaze direction data indicating that that player has an interest in a given reel of the plurality of reels while the given reel is still spinning, generating an anticipation event that increases the player excitement, and wherein the anticipation event comprises an anticipation sound and/or a delay in stopping the given reel.

15. The method according to claim 1, wherein determining the triggering condition comprises determining that the player is confused about playing the wagering game, and wherein modifying the game window comprises displaying information corresponding to playing the wagering game.

16. The method according to claim 1, wherein the game window comprises a first game window and the electronic display screen comprises a first electronic display screen, wherein operating the wagering game further comprises displaying the first game window on the first electronic display screen and a second game window on a second electronic display screen, wherein receiving the gaze direction data comprises receiving, using a first data capture camera device, first gaze direction data corresponding to the first electronic display screen and receiving, using a second data capture camera device, second gaze direction data corresponding to the second electronic display screen, wherein responsive to moving the game element in a path that goes from the first electronic display screen to the second electronic display screen, calibrating the first or second gaze direction data.

17. A method of operating an electronic gaming machine, comprising:

displaying a game window associated with a wagering game on an electronic display screen of the electronic gaming machine, the game window including first content;

receiving, using at least one data capture camera device, gaze direction data that corresponds to a player and that includes information corresponding to a location towards which a gaze of the player is directed;

evaluating the gaze direction data to determine a triggering condition corresponding to the first content;

modifying the game window responsive to determining the triggering condition that is based on the gaze direction data; and receiving interest data that corresponds to associations between game elements and player interest data that corresponds to ones of the game elements and that is determined based on the gaze direction data, wherein modifying the game window comprises providing second content that is different from the first content and that includes ones of the game elements that the player interest data indicates are interesting to the player.

18. The method according to claim 17, wherein the game window further comprises second content that is different from the first content, wherein the first content is associated with a first game and the second content is associated with a second game, wherein evaluating the gaze direction data comprises determining a first amount of time during a time interval that the player is looking at the first content and a second amount of time during the time interval that the player is looking at the second content, wherein the triggering condition corresponds to the gaze direction data indicating that the player is looking at the first content more than the second content, and wherein modifying the game window comprises modifying a display order to display the first content at a higher position than the second content.

19. The method according to claim 17, wherein the game elements include at least one of a game feature type, a game element category, a game theme, a color, and a graphics property.

20. The method according to claim 17, wherein modifying the game window comprises removing the first content that includes ones of the game elements that the player interest data indicates are not interesting to the player.

21. The method according to claim 17, wherein the game window comprises a game selection window that includes selection content corresponding to a plurality of games, and wherein an arrangement of the plurality of games is based on the gaze direction data.

22. An electronic gaming machine, comprising:

a processor;

a display device;

a display controller coupled to the processor and the display device; and a gaze detection unit coupled to the processor and configured to detect a gaze direction of the viewer;

wherein the processor is configured to:

operate a wagering game on the electronic gaming machine, wherein to operate the wagering game on the electronic gaming machine, the processor is further configured to:

display a game window associated with the wagering game on an electronic display screen of the electronic gaming machine, the game window including a game element;

receive, using at least one data capture camera device, gaze direction data that corresponds to a player and that includes information corresponding to a location towards which a gaze of the player is directed;

evaluate the gaze direction data to determine a triggering condition corresponding to the game element; and modify the game window responsive to determining the triggering condition that is based on the gaze direction data; and based on the gaze direction data, an emotional state of the player that corresponds to the player looking at the game element, wherein, responsive to determining that the player has a positive emotional state corresponding to the game element, to modify the game window to increase a presence of the game element, and wherein, responsive to determining that the player has a negative emotional state corresponding to the game element, to modify the game window to reduce the presence of the game element.

23. The electronic gaming machine according to claim 22, wherein the processor is further configured to: determine that player is looking at a mobile device and include a game element to attract attention of the player or send the mobile device a message that provides an option to play the wagering game on the mobile device.

* * * * *